United States Patent
Wu

(10) Patent No.: US 9,894,519 B2
(45) Date of Patent: Feb. 13, 2018

(54) CONNECTION MODIFICATION METHOD APPLICABLE TO USER EQUIPMENT AND BASE STATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 19 days.

(21) Appl. No.: 14/656,722

(22) Filed: Mar. 13, 2015

(65) Prior Publication Data

US 2015/0264562 A1    Sep. 17, 2015

Related U.S. Application Data

(60) Provisional application No. 61/952,894, filed on Mar. 14, 2014, provisional application No. 61/954,578, (Continued)

(51) Int. Cl.
*H04K 1/00* (2006.01)
*H04W 12/04* (2009.01)
(Continued)

(52) U.S. Cl.
CPC ........... *H04W 12/04* (2013.01); *H04L 5/0032* (2013.01); *H04W 12/02* (2013.01); *H04W 36/0055* (2013.01); *H04W 76/046* (2013.01)

(58) Field of Classification Search
None
See application file for complete search history.

(56) References Cited

U.S. PATENT DOCUMENTS 9,756,678 B2 * 9/2017 Yamada .............. H04W 76/046
2009/0103478 A1 * 4/2009 Sammour ............ H04L 1/1874
370/328

(Continued)

FOREIGN PATENT DOCUMENTS

| EP | 2139292 | 12/2009 |
|---|---|---|
| JP | 2012165441 | 8/2012 |
| WO | 2014008380 | 1/2014 |

OTHER PUBLICATIONS

3GPP, 3GPP TS 36.331 V12.0.0, 3rd Generation Partnership Project; Technical Specification Group Radio Access Network; Evolved Universal Terrestrial Radio Access (E-UTRA); Radio Resource Control (RRC); Protocol specification, Dec. 2013, pp. 1-349.

(Continued)

*Primary Examiner* — Lisa Lewis
*Assistant Examiner* — Olanrewaju Bucknor
(74) *Attorney, Agent, or Firm* — JCIPRNET

(57) ABSTRACT

The disclosure is directed to a connection modification method in a dual connectivity scenario. In one of the exemplary embodiments, a UE configures a first MCG bearer for communication with a first base station; configures a SCG bearer for communication with a second base station; generates and transmits a first encrypted PDCP SDU by encrypting a first PDCP SDU of the first MCG bearer by using a first security key, a first TX_HFN and a first PDCN SN associated with the first PDCP SDU; generates and transmits a second encrypted PDCP SDU; receives a third bearer configuration re-configuring the SCG bearer as either a second MCG bearer or a split bearer; generates a third encrypted PDCP SDU by encrypting a third PDCP SDU of the SCG bearer and transmits the third encrypted PDCP SDU after the SCG bearer is reconfigured as the second MCG bearer or the split bearer.

6 Claims, 17 Drawing Sheets

Related U.S. Application Data filed on Mar. 17, 2014, provisional application No. 61/990,724, filed on May 9, 2014.

(51) Int. Cl.
*H04L 5/00* (2006.01)
*H04W 76/04* (2009.01)
*H04W 12/02* (2009.01)
*H04W 36/00* (2009.01)

(56) References Cited

U.S. PATENT DOCUMENTS

| | | | | |
|---|---|---|---|---|
| 2012/0106511 | A1* | 5/2012 | Wu | H04W 76/064 370/331 |
| 2012/0307741 | A1* | 12/2012 | Wu | H04W 76/028 370/328 |
| 2014/0010207 | A1* | 1/2014 | Horn | H04W 36/165 370/332 |
| 2014/0056243 | A1* | 2/2014 | Pelletier | H04W 74/04 370/329 |
| 2014/0204771 | A1* | 7/2014 | Gao | H04W 36/28 370/252 |
| 2014/0295838 | A1* | 10/2014 | Won | H04W 60/04 455/435.1 |
| 2015/0043435 | A1* | 2/2015 | Blankenship | H04L 69/322 370/329 |
| 2015/0264609 | A1* | 9/2015 | Zhang | H04W 36/0055 455/436 |
| 2015/0327094 | A1* | 11/2015 | Lee | H04L 5/0035 370/252 |
| 2015/0358866 | A1* | 12/2015 | Xu | H04W 36/00 370/331 |
| 2016/0021581 | A1* | 1/2016 | Deenoo | H04W 36/0055 370/331 |
| 2016/0028585 | A1* | 1/2016 | Wager | H04B 7/024 455/452.2 |
| 2016/0037406 | A1* | 2/2016 | Centonza | H04W 36/04 370/332 |
| 2016/0044540 | A1* | 2/2016 | He | H04W 76/00 370/237 |
| 2016/0066241 | A1* | 3/2016 | Wu | H04W 36/28 370/331 |
| 2016/0249259 | A1* | 8/2016 | Park | H04W 36/00 |

OTHER PUBLICATIONS

3GPP, 3GPP TS 36.331 V12.1.0, 3rd Generation Partnership Project; Technical Specification Group Radio Access Network; Evolved Universal Terrestrial Radio Access (E-UTRA); Radio Resource Control (RRC); Protocol specification, Mar. 2014, pp. 1-356.

3GPP, 3GPP TSG-RAN WG2 #85bis Change Request, Introduction of Dual Connectivity, Apr. 2014, pp. 1-48.

Broadcom Corporation, "SCG handover for Dual Connectivity", 3GPP TSG-RAN WG2 Meeting #85, Prague, Czech Republic, Feb. 10-14, 2014, pp. 1-6.

Samsung, "SCG user plane security in 1A", 3GPP TSG RAN WG2 #85, Frague, Czech Republic, Feb. 10-14, 2014, pp. 1-4.

Kyocera, "Handover enhancements with dual connectivity", 3GPP TSG-RAN WG2 #85, Prague, Czech Republic, Feb. 10-14, 2014, pp. 1-8.

NTT Docomo, Inc., "Introduction of Dual Connectivity", 3GPP TSG-RAN WG2 #85, Prague, Czech Republic, Feb. 10-14, 2014, pp. 1-45.

Samsung, "Basic Singalling flow and mobility Scenarios in Dual Connectivity", 3GPP TSG-RAN WG3 #83, Prague, Czech Republic, Feb. 10-14, 2014, pp. 1-3.

NTT Docomo, Inc., "Status Report to TSG 1 work plan related evaluation", 3GPP TSG RAN meeting #63, Fukuoka, Japan, Mar. 3-6, 2014, pp. 1-12.

Huawei et al., "Security aspects of dual connectivity operation", 3GPP TSG-RAN WG2 Meeting #85, Prague, Czech Republic, Feb. 10-14, 2014, pp. 1-6.

"Search Report of European Counterpart Application" , dated Jul. 28, 2015, p. 1-p. 7.

Samsung, "Discussion on Security Aspects of SCE UP Architecture," 3GPP TSG SA WG3 (Security) Meeting #73, S3-130989, Nov. 11-15, 2013, pp. 1-4.

"Office Action of Japan Counterpart Application," issued on Mar. 1, 2016, p. 1-p. 5.

* cited by examiner

CONNECTION MODIFICATION METHOD APPLICABLE TO USER EQUIPMENT AND BASE STATION

CROSS REFERENCE TO RELATED APPLICATION

This application claims the priority benefit of U.S.A. provisional application Ser. No. 61/952,894, filed on Mar. 14, 2014, U.S.A. provisional application Ser. No. 61/954,578, filed on Mar. 17, 2014, and U.S.A. provisional application Ser. No. 61/990,724, filed on May 9, 2014. The entirety of each of the above-mentioned patent applications is hereby incorporated by reference herein and made a part of specification.

TECHNICAL FIELD

The disclosure is directed to a connection modification method applicable to a user equipment (UE) connected to multiple base stations and applicable to a base station which provides service to a UE connected to multiple base stations.

BACKGROUND

A long-term evolution (LTE) system that supports the $3^{rd}$ Generation Partnership Project (3GPP) Release 8 standard and/or the 3GPP Release 9 standard has been developed by the 3GPP has a successor of a universal mobile telecommunications systems (UMTS) to enhance further performances of the UMTS so as to satisfy the increasing needs of users. Such LTE system would include a new radio interface and a new radio network architecture that provides high data rate, low latency, optimized data packet, improved system capacity, and improved system coverage. In a LTE system, a radio access network (RAN) known as an evolved universal terrestrial radio network (E-UTRAN) may include at least one evolved Node B (eNB) that would communicate with at least one multiple user equipment (UE). An eNB may also communicate with a core network through a mobility management entity (MME) to reach various network entities such as various gateways and servers within the non-access stratum (NAS) level of the core network.

A LTE-advanced (LTE-A) system, as its name implies, is a more advanced LTE system. A LTE-A communication system would provide, relative to its predecessors, faster switching between power states, better performance at the edge of the coverage of an eNB, and also advanced techniques such as carrier aggregation (CA), coordinated multipoint (CoMP) transmission/reception, UL multiple-input multiple-output (MIMO), and so forth. In order for a UE and an eNB to communicate with each other in the LTE-A system, the UE and the eNB must meet the standards developed for a LTE-A system such as the 3GPP Release 10 standard or later versions.

A small cell controlled by a low-power base station such as a micro cell base station, pico cell base station, femto cell base station, and so forth, could be deployed to satisfy increasing network traffic resulted from increasing demands of mobile electronic devices. A small cell could be deployed as hot spots for both indoor and outdoor scenarios. A low power base station could generally be defined as a base station having an operating power lower than that of a macro cell base station such as a macro NodeB, a macro eNB, or other variants. A UE may thus simultaneously communicate with a macro cell base station and a small cell base station by applying dual connectivity. In this instance, a UE may transmit or receive user data and control information via both the macro cell base station and the lower power base station. The dual connectivity may provide for the UE the benefit of an increased data throughput resulted from the simultaneous dual transmissions with a macro base station.

Any base station may serve two different roles as either a master eNB (MeNB) or a secondary eNB (SeNB), although typically a macro cell base station would be the MeNB and the small cell base station would be the SeNB. FIG. 1 illustrates a dual connectivity scenario applicable to a wireless communication system in which a UE is dual connected to two base stations. The wireless communication system could be a LTE or LTE-A communication system and would include at least but not limited to a MeNB 101, a SeNB 102, a UE 103. The MeNB 101 could be a macro cell base station and would provide a first coverage area 105, and the SeNB 102 could be a small cell base station and would provide a second coverage area 104 which is smaller than the first coverage area 105. The second coverage 104 could either overlap completely with the first coverage area 105 or could be partially outside of the first coverage area 105. For the wireless communication system of FIG. 1, the UE 103 would be able to communicate with both the MeNB 101 and the SeNB 102 at the same time. This means that, at some point in time, the UE 103 would be capable of performing an uplink transmission to both a cell of the MeNB 101 and a cell of the SeNB 102 as well as a downlink reception from both the cell of the MeNB 101 and the cell of the SeNB 102.

It should be noted that MeNB 101 and SeNB 102 may operate under different carrier frequencies. Hypothetically, assuming that a carrier aggregation scheme is used by the wireless communication system 100, which is for example a LTE-A communication system, MeNB 101 may operate a first component carrier (CC1) and SeNB may operate under a second component carrier (CC2), and the frequency spectrum of CC1 does not overlap with the frequency spectrum of CC2.

FIG. 2A illustrates a general RAN protocol architecture implemented by the exemplary wireless communication system of FIG. 1. The radio protocol architecture that a particular radio bearer uses depends on how the radio bearer is setup. A radio bearer can be a data radio bearer (DRB) for user plane data transmission and/or reception for a signaling radio bearer (SRB) for control plane data transmission and/or reception. A DRB for control plane includes DRB identity, EPS bearer identity, Packet Data Convergence Protocol (PDCP) configuration (e.g. header compression configuration), logical channel identity and logical channel configuration (e.g. priority and logical channel group). A SRB configuration includes SRB identity, Radio Link Control (RLC) configuration and logic channel configuration.

In dual connectivity, as shown in FIG. 2B, there could be at least three types of dual connectivity radio bearers: Master cell group (MCG) bearer 211, secondary cell group (SCG) 212 bearer and split bearer 213. The MCG bearer 211 utilizes radio protocols only located in MeNB (e.g. 101) to use MeNB resources only. SCG bearer 212 utilizes radio protocols only located in the SeNB (e.g. 102) to use SeNB resources. Split bearer 213 utilizes radio protocols located in both the MeNB (e.g. 101) and the SeNB (e.g. 102) to use both MeNB and SeNB resources. In general, a DRB can be a MCG bearer, a SCG bearer, or a split bearer. Also in general, a SRB can be a MCG bearer, a SCG bearer, or a split bearer.

A RB (i.e. DRB or SRB) is associated with one PDCP entity. The PDCP entity is associated with one or two (one for each direction) RLC entities depending on RB characteristic (i.e. uni-directional or bi-directional) and RLC mode (e.g. acknowledged mode or unacknowledged mode). For a split bearer, a PDCP entity is associated with two AM RLC entities. For encryption/decryption and integrity protection/check, a COUNT value associated to a PDCP service data unit (SDU) would be maintained by the UE side as well as base station(s) that provide services to the UE. The COUNT value is composed of a hyper frame number (HFN) and a PDCP sequence number. A state variable Next_PDCP_TX_SN indicates the PDCP sequence number of the next PDCP SDU to be transmitted by a PDCP entity. A state variable TX_HFN indicates HFN value for the generation of COUNT value used for encrypting or integrity protecting PDCP PDUs to be transmitted. A state variable Next_PDCP_RX_SN indicates the next expected PDCP sequence number by a receiving PDCP entity. A state variable RX_HFN indicates the HFN value for the generation of the COUNT value used for the received PDCP PDUs. Mechanisms involving transmissions and receptions of PDCP PDUs with the state variables as described above could be seen in 3GPP TS 36.323 which is incorporated by reference.

In dual connectivity, even though a DRB could be initiated as a MCG bearer, a SCG bearer, or a split bearer, the DRB could be reconfigured from one dual connectivity radio bearer into another dual connectivity radio bearer. In other words, after a MeNB sets up a DRB, the MeNB may reconfigure a DRB from a first dual connectivity radio bearer into a second dual connectivity radio bearer. Various possibilities are described below.

A first possibility involves a first SCG bearer that is changed into a second SCG bearer. That would occur in response to a DRB that has been configured as a first SCG bearer under a first SeNB but is reconfigured to be a second SCG bearer under a second SeNB because of a SeNB change.

A second possibility involves a SCG bearer that is changed into a MCG bearer. That would occur in response to a DRB that has been configured as a SCG bearer under a SeNB but is reconfigured to be a MCG bearer under a MeNB because of a circumstance such as the removal of the SeNB.

A third possibility involves a SCG bearer that is changed into a split bearer. That would occur in response to a DRB that has been configured as a SCG bearer under a SeNB but is reconfigured to be a split bearer under MeNB because of a circumstance such as offloading of traffic to the SeNB.

A fourth possibility involves a MCG bearer that is changed into a SCG bearer. That would occur in response to a DRB that has been configured as a MCG bearer under a MeNB but is reconfigured to be a SCG bearer under a SeNB because of a circumstance such as offloading traffic to the SeNB.

A fifth possibility involves a split bearer that is changed into a SCG bearer. That would occur in response to a DRB that has been configured as a split bearer but is reconfigured to be a SCG bearer because of a circumstance such as offloading traffic to the SeNB.

A sixth possibility involves a split bearer that is changed into a MCG bearer. That would occur in response to a DRB that has been configured as a split bearer but is reconfigured to be a MCG bearer because of a circumstance such as the removal of the SeNB.

A seventh possibility involves a first split bearer that is changed into a second split bearer. That would occur in response to a DRB that has been configured as a first split bearer but is reconfigured to be a MCG bearer because of a SeNB change.

An eighth possibility involves a MCG bearer that is changed into a split bearer. That would occur in response to a DRB that has been configured as a MCG bearer under MeNB but is reconfigured to be a split bearer because of a circumstance such as offloading traffic to a SeNB.

Mechanisms involving a DRB changing from one dual connectivity radio bearer into another dual connectivity radio bearer could be seen from references such as 3GPP TS 36.331 v12.1.0 and 3GPP R2-141857 which are incorporated by reference.

FIG. 3 illustrates a signaling diagram of a secondary cell group (SCG)/SeNB modification procedure. The SCG modification procedure would be initiated by a SeNB and would be used to perform configuration change of the SCG within the same SeNB. In step S301, a SeNB (e.g. SeNB 102) may transmit a SCG Modification Request message via the X2 interface application protocol (AP) in order to request a SCG modification by providing a new radio resource configuration of the SCG by a Radio Resource Control (RRC) container in the SCG Modification Request message. In step S302, in response to the SCG Modification Request message being received and accepted by a MeNB (e.g. MeNB 101), the MeNB may transmit to a UE (e.g. UE 103) a RRCConnectionReconfiguration message which includes the new radio resource configuration of SCG according to the SCG Modification Request message. In step S303, the UE may apply the new radio resource configuration of SCG and subsequently transmit a RRCConnectionReconfigurationComplete message back to the MeNB as a reply. Assuming that synchronization between the UE and the SeNB is not required to execute the new radio resource configuration of SCG the UE may perform UL transmissions after having applied the new configuration. If the new radio resource configuration of SCG requires synchronization between the UE and the SeNB, in step S305 the UE may initiate a Random Access (RA) procedure. In step S304. The MeNB may reply a SCG Modification Response to the SeNB by transmitting a RRCConnectionReconfigurationComplete message via the X2-AP.

Under the circumstance in which the UE is unable to comply with (part of) the radio resource configuration of SCG as included in the RRCConnectionReconfiguration message back in step S302, the UE may perform a reconfiguration failure procedure. The order of the UE transmitting the RRCConnectionReconfigurationComplete message and performing the RA procedure toward the SCG has not been defined. The success of the RA procedure towards the SCG is not required for a successful completion of the RRCConnectionReconfiguration procedure. The primary SCell (PSCell) in SCG could be changed with the SCG Modification procedure. The SeNB may decide whether the RA procedure is required according to, for example, whether an old special SCell or a new special SCell belongs to the same TAG The SeNB may trigger the release of SCG Scells(s) other than PSCell, and the MeNB cannot reject.

FIG. 4 illustrates a signaling diagram of a SCG addition/MeNB triggered modification procedure. The SCG addition procedure would typically be initiated by the MeNB to add the first cell of the SCG A MeNB may use a same or similar procedure to initiate an addition or a release of SCG cells and of SCG bearers. For all SCG modifications other than release of the entire SCG a SeNB would generate the signaling toward a UE. The MeNB may request to add particular SCells to the SeNB, and the SeNB may reject. By using the modification procedure, the MeNB may trigger the release of SCG SCells(s) other than pSCell, and in this case the SeNB cannot reject.

In step S401, the MeNB would transmit, via the X2-AP, a SCG addition/modification request message including a MCG configuration and (part of) UE capabilities for UE capability coordination to be used as a basis for the reconfiguration by the SeNB. In case of SCG addition and SCG SCell addition request, the MeNB can provide the latest measurement results (FFS for which SeNB cells). The SeNB may reject such request. In step S402, assuming that the SeNB accepts the MeNB request, the SeNB would initiate a SCG Modification procedure as specified in 10.1.2x.1 in R2-141857 and would provide a subsequent response which may be before or after the SCG Modification procedure. A SCG change procedure could be used to change a configured SCG of one SeNB to another SeNB in the UE and would be realized by a SCG Modification procedure. A RRCConnectionReconfiguration message transmitted during the SCG modification procedure would include information for the release of the source SCG.

In the aforementioned dual connectivity scenario, a UE would, at most of the time, connect to both a MeNB and a SeNB. However, as a UE is moving, the E-UTRAN that provides wireless service for the UE may change the MeNB and/or the SeNB for the UE. It should be noted that this scenario different from a typical handover scenario in which the UE is handover from a base station to another. For dual connectivity scenario, the UE would be simultaneously connected to both MeNB and SeNB and typically one of the MeNB and SeNB might change at a time.

However, during such period of changing the MeNB and/or SeNB for the UE, the data transmission and data reception would likely be either suspended or failed. The suspension or failure might impose potentially numerous difficulties for the network which attempts to implement lossless operations at all times. As an example, the encryption and decryption process would involve using a TX_HFN as shown in FIG. 2C. However, if a transmission has failed at TX_HFN=2 due to e.g. changing the SeNB to another eNB for the UE, it is uncertain what TX_HFN value should be used after the SeNB is changed to the other eNB.

Therefore, how to resume or recover data transmission and data reception after changing the MeNB and/or SeNB could be one of the design considerations as the current wireless technology moves forward.

SUMMARY OF THE DISCLOSURE

The disclosure is directed to a connection modification method applicable to a user equipment (UE) connected to multiple base stations and applicable to a base station which provides service to a UE connected to multiple base stations.

In one of the exemplary embodiments, the disclosure is directed to a connection modification method applicable to a user equipment (UE) which is capable of dually connecting to a first base station and a second base stations. The method would include not limited to receiving a first bearer configuration which configures a first master cell group (MCG) bearer for communication with the first base station from the first base station; configuring a first radio bearer as the first MCG bearer according to the first bearer configuration; receiving a second bearer configuration which configures a secondary cell group (SCG) bearer for communication with the second base station from the first base station; configuring a second radio bearer as the SCG bearer according to the second bearer configuration; generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCN sequence number (SN) associated with the first PDCP SDU; transmitting the first encrypted PDCP SDU to the first base station; generating a second encrypted PDCP SDU by encrypting a second PDCP SDU of the second radio bearer by using a second security key, a second TX_HFN and a second PDCP SN associated with the second PDCP SDU; transmitting the second encrypted PDCP SDU to the second base station; receiving a radio resource control (RRC) message comprising a third bearer configuration re-configuring the SCG bearer to be either a second MCG bearer or a split bearer from the first base station; re-configuring the second radio bearer either as the second MCG bearer or the split bearer according to the third bearer configuration; generating a third encrypted PDCP SDU by encrypting a third PDCP SDU of the second radio bearer by using the first security key, the second TX_HFN and a third PDCP SN associated with the third PDCP SDU, after the second radio bearer is reconfigured to the second MCG bearer or the split bearer; and transmitting the third encrypted PDCP SDU to the first base station.

In one of the exemplary embodiments, the disclosure is directed to a connection modification method applicable to a user equipment (UE) capable of dually connecting to a first and a second base stations. The method would include not limited to receiving a first bearer configuration configuring a first master cell group (MCG) bearer for communication with the first base station from the first base station; configuring a first radio bearer as the first MCG bearer according to the first bearer configuration; receiving a second bearer configuration configuring a second MCG bearer or a split bearer for communication with the first base station from the first base station; configuring a second radio bearer as the second MCG bearer or the split bearer according to the second bearer configuration; receiving a third bearer configuration configuring a first secondary cell group (SCG) bearer for communication with the second base station, from the first base station; configuring a third radio bearer as the first SCG bearer according to the third bearer configuration; generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCP sequence number (SN) associated with the first PDCP SDU; transmitting the first encrypted PDCP SDU to the first base station; generating a second encrypted PDCP SDU by encrypting a second PDCP SDU of the second radio bearer by using the first security key, a second TX_HFN and a second PDCP SN associated with the second PDCP SDU; transmitting the second encrypted PDCP SDU to the first base station; generating a third encrypted PDCP SDU by encrypting a third PDCP SDU of the third radio bearer by using a second security key, a third TX_HFN and a third PDCP SN associated with the third PDCP SDU; transmitting the third encrypted PDCP SDU to the second base station; receiving a radio resource control (RRC) message comprising a fourth bearer configuration re-configuring the second MCG bearer or the split bearer to be a second SCG bearer; re-configuring the second radio bearer as the second SCG bearer according to the fourth bearer configuration; generating a fourth encrypted PDCP SDU by encrypting a fourth PDCP SDU of the second radio bearer by using the second security key, the second TX_HFN and a fourth PDCP SN associated with the fourth PDCP SDU, after the second radio bearer is reconfigured to the second SCG bearer; and transmitting the fourth encrypted PDCP SDU to the second base station.

In one of the exemplary embodiments, the disclosure is directed to a connection modification method applicable to a first base station serving a user equipment (UE) capable of dually connecting to the first base station and a second base station. The method would include receiving a first SCG configuration to establish a first SCG bearer for the UE from the second base station; transmitting a first radio resource control (RRC) message comprising the first SCG configuration, to the UE; transmitting a first SCG addition request comprising the first SCG configuration for establishing a second SCG bearer for the UE, to a third base station; receiving a first SCG addition response comprising a second SCG configuration which is based on the first SCG configuration in response to transmitting the first SCG addition request, from the third base station; and transmitting a SCG release request to release the first SCG bearer, to the second base station; transmitting a second RRC message comprising the second SCG configuration to establish the second SCG bearer, to the UE.

In one of the exemplary embodiments, the disclosure is directed to a connection modification method applicable to a base station. The method would include not limited to transmitting a first radio resource control (RRC) message to configure a first master cell group (MCG) bearer for communication to a UE; transmitting to the UE a first Packet Data Convergence Protocol (PDCP) service data unit (SDU) encrypted with a first security key; receiving a first secondary cell group (SCG) configuration configuring a first SCG bearer and a second SCG configuration configuring a second SCG bearer, from another base station; transmitting at least one second RRC message to configure the first SCG bearer and the second SCG bear in response to receiving the first SCG configuration and the second SCG configuration; transmitting a message to release the first SCG bear, to the other base station; receiving a transmitter hyper frame number (TX_HFN) and a Next_PDCP_TX_SN of the first SCG bearer, from the other base station; transmitting a third RRC message reconfiguring the first SCG bearer to be a second MCG bearer or a split bearer to the UE; and transmitting a second PDCP SDU encrypted by using the first security key, the TX_HFN and the Next_PDCP_TX_SN, via the MCG bearer or the split bearer.

In one of the exemplary embodiments, the disclosure is directed to a connection modification method applicable to a base station. The method would include not limited to: transmitting a first secondary cell group (SCG) configuration configuring a first SCG bearer for a UE to another base station; receiving a message requesting establishing a second SCG bearer replacing a second MCG bearer or a split bearer of the UE, from the other base station; receiving a transmitter hyper frame number (TX_HFN) and a Next_PDCP_TX_SN of the second MCG bearer or the split bearer from the other base station; generating an encrypted PDCP SDU by encrypting a PDCP SDU using a security key, the TX_HFN and the Next_PDCP_TX_SN; and transmitting the encrypted PDCP SDU via the second SCG bearer to the UE.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
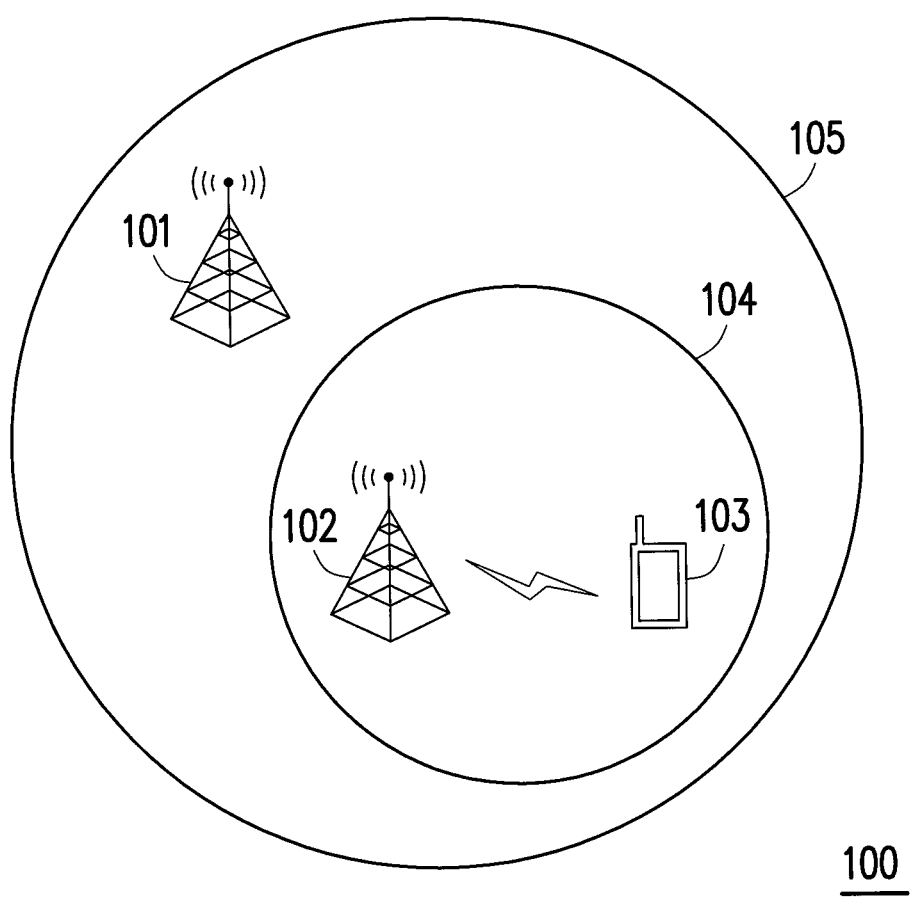
FIG. 1 illustrates a dual connectivity scenario applicable to a wireless communication system in which a UE is dual connected to two base stations.
Figure 2A:
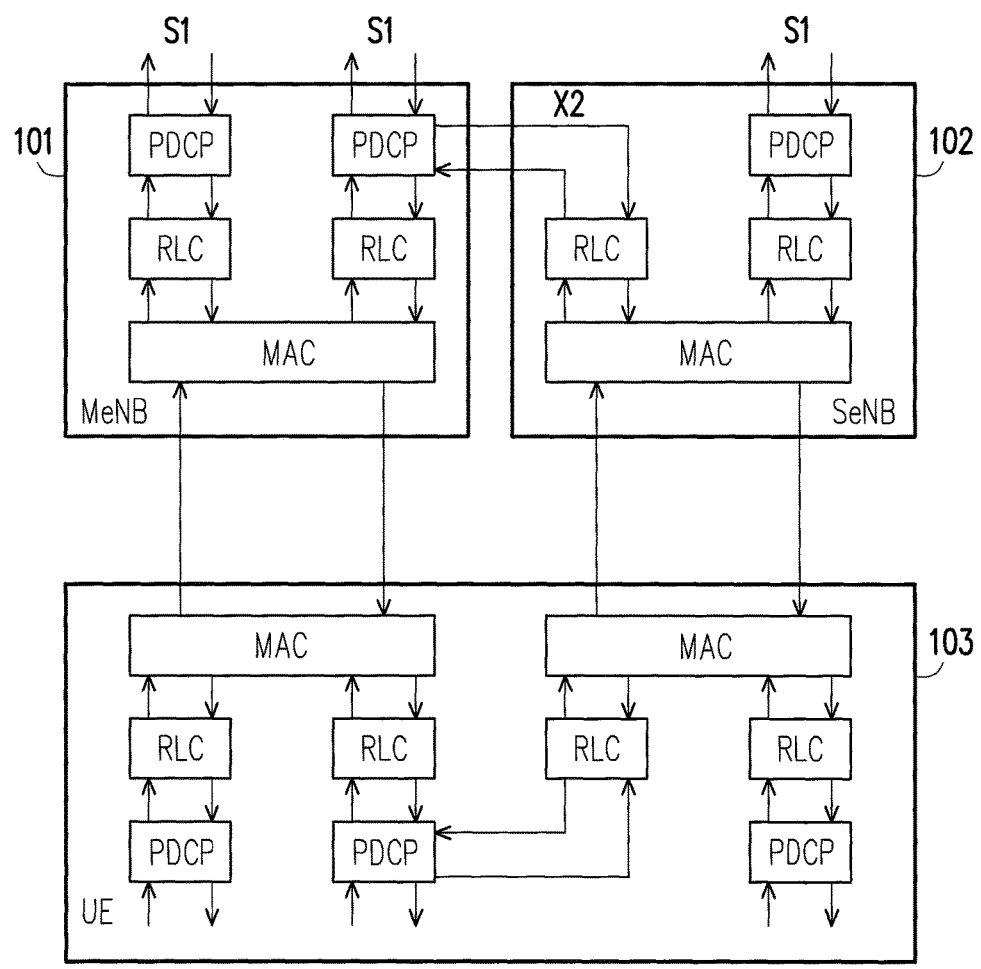
FIG. 2A illustrates a general RAN protocol architecture implemented by the exemplary wireless communication system of FIG. 1.
Figure 2B:
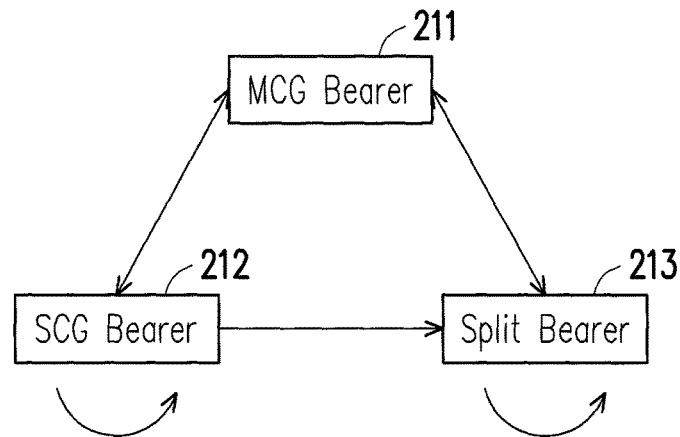
FIG. 2B illustrates three types of radio bearers and reconfiguration of radio bearer type in dual connectivity.
Figure 2C:
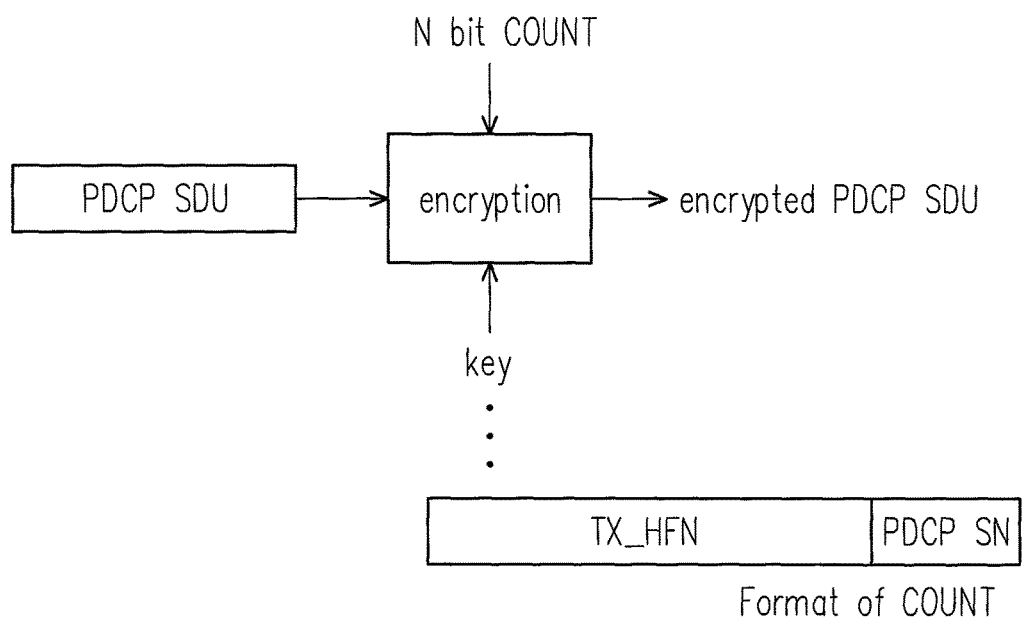
FIG. 2C illustrates an encryption procedure as an example of a difficulty that might occur when a transmission has failed or suspended.
Figure 3:
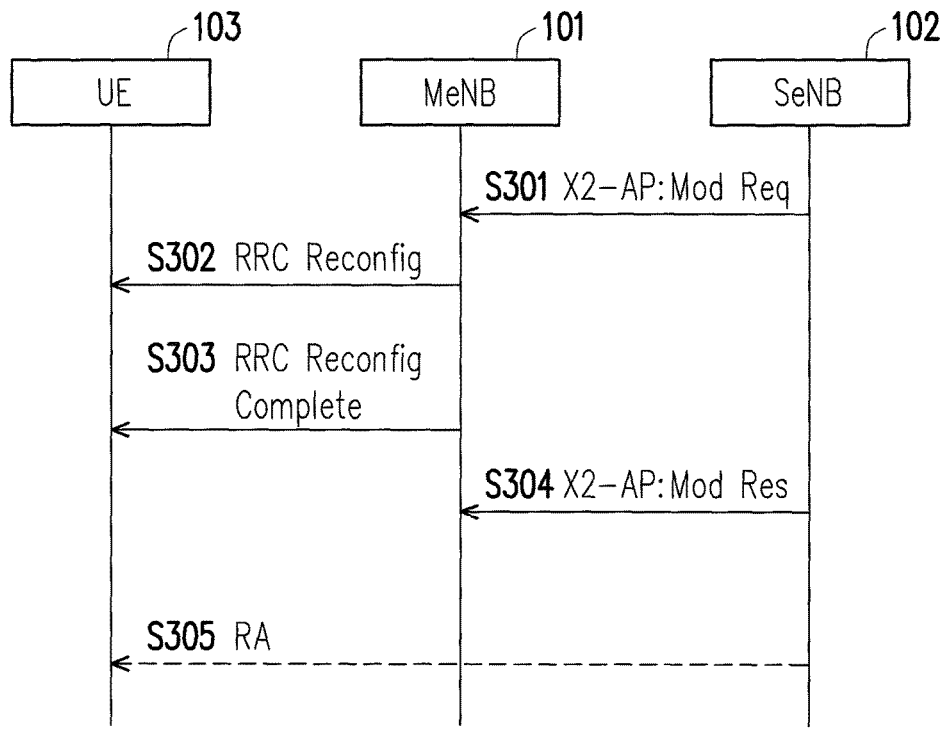
FIG. 3 illustrates a signaling diagram of a secondary cell group (SCG) modification procedure.
Figure 4:
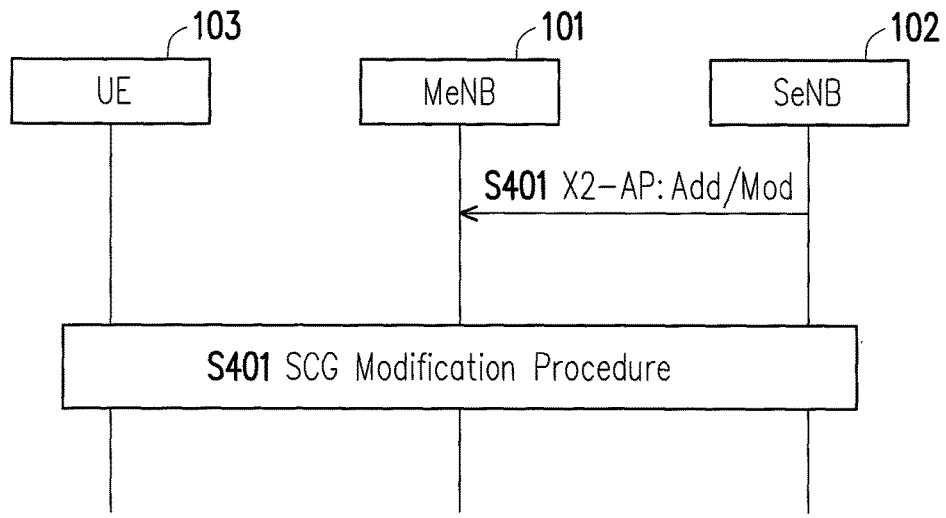
FIG. 4 illustrates a signaling diagram of a SCG addition/MeNB triggered Modification procedure.

Reference will now be made in detail to the present exemplary embodiments of the disclosure, examples of which are illustrated in the accompanying drawings. Wherever possible, the same reference numbers are used in the drawings and the description to refer to the same or like parts.

Figure 5:
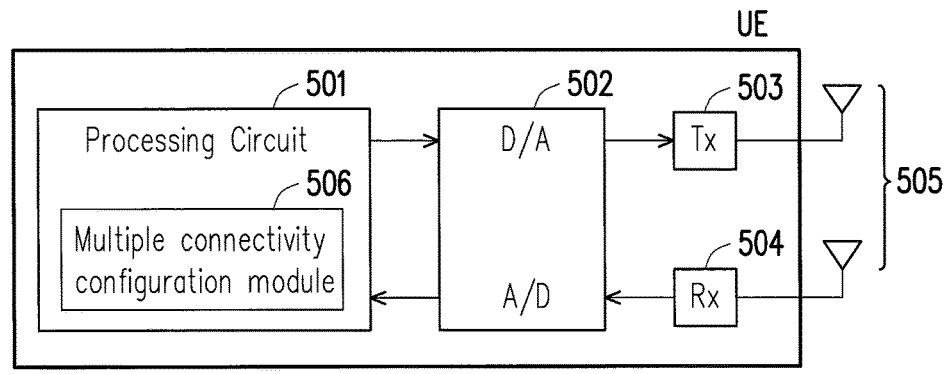
FIG. 5 illustrates the hardware components of a UE in terms of functional block diagrams in accordance with one of the exemplary embodiments of the disclosure.

FIG. 5 illustrates the hardware components of a UE in terms of functional block diagrams in accordance with one of the exemplary embodiments of the disclosure. The exemplary UE would include not limited to a processing circuit 501, an analog to digital (A/D)/digital to analog (D/A) converting circuit 502, a transmitter 503, a receiver 504, one or more antennas 505, and a non-transitory storage medium or memory unit (not shown) coupled to the processing circuit 501. The UE would receive radio frequency (RF) data through the one or more antennas 505 which would be coupled to the receiver 504 via a matching network and a filter. The receiver 504 would be coupled to the A/D D/A converter 502 and would down convert the RF data directly or indirectly into baseband data. The baseband data is converted by the A/D converter 502 into digital data which would be transmitted to the processing circuit 501. The UE would also transmit data by transmitting digital data to the D/A converter 502 to be converted into baseband data. The baseband data would be up converted into RF data by the transmitter 503 which transmits RF data via the one or more antennas 505.

The processing circuit 501 would include one or more processing means such as a microprocessor, microcontroller, and application specific integrated circuit (ASIC). Contained within the processing circuit 501 is a multiple connectivity configuration module 506 which would be directly involved or indirectly assist in the execution of the proposed connection modification method including the first, second, . . . , sixth exemplary embodiments. The storage medium may store programming codes, buffered and permanent data related to the operations of the proposed connection modification method.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 6:
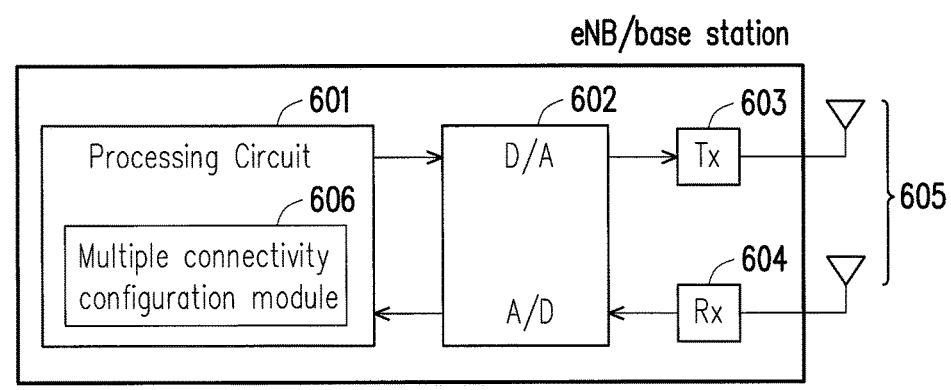
FIG. 6 illustrates the hardware components of a base station in terms of functional block diagrams in accordance with one of the exemplary embodiments of the disclosure.

FIG. 6 illustrates the hardware components of a base station in terms of functional block diagrams in accordance with one of the exemplary embodiments of the disclosure. A base station may include not limited to a processing circuit 601, an A/D D/A converter circuit 602, a transmitter 603, a receiver 604, one or more antennas 605, and a non-transitory storage medium (not shown). Contained within the processing circuit 601 is a multiple connectivity configuration module 606 which would be directly involved or indirectly assist in the execution of the proposed connection modification method including the first, second, . . . , sixth exemplary embodiments. The written descriptions of these components would be similar to the descriptions of a UE in FIG. 5 and thus would not be repeated.

The phrase "base station" in this disclosure could be synonymous with "eNB", and also these descriptions could cover obvious variants such as a master base station, secondary base station, slave base station, macro cell base station, micro cell base station, pico cell base station, femto cell base station, and so like. It would also be apparent to those skilled in the art that other types of base stations could be applicable to achieve similar network access purposes such as an advanced base station (ABS), a base transceiver system (BTS), an access point (AP), a home base station, a relay station, a scatter, a repeater, an intermediate node, an intermediary, and/or satellite-based communications base stations.

In order to solve the aforementioned problem, the disclosure provides a method and related communication devices for processing changes in data transmission and reception in order to cope with a change of type of a radio bearer that was serving a UE so as to solve the aforementioned problem. In order to adequately cover different scenarios, six exemplary embodiments are provided to elucidate various concepts of the disclosure.

Figure 7:
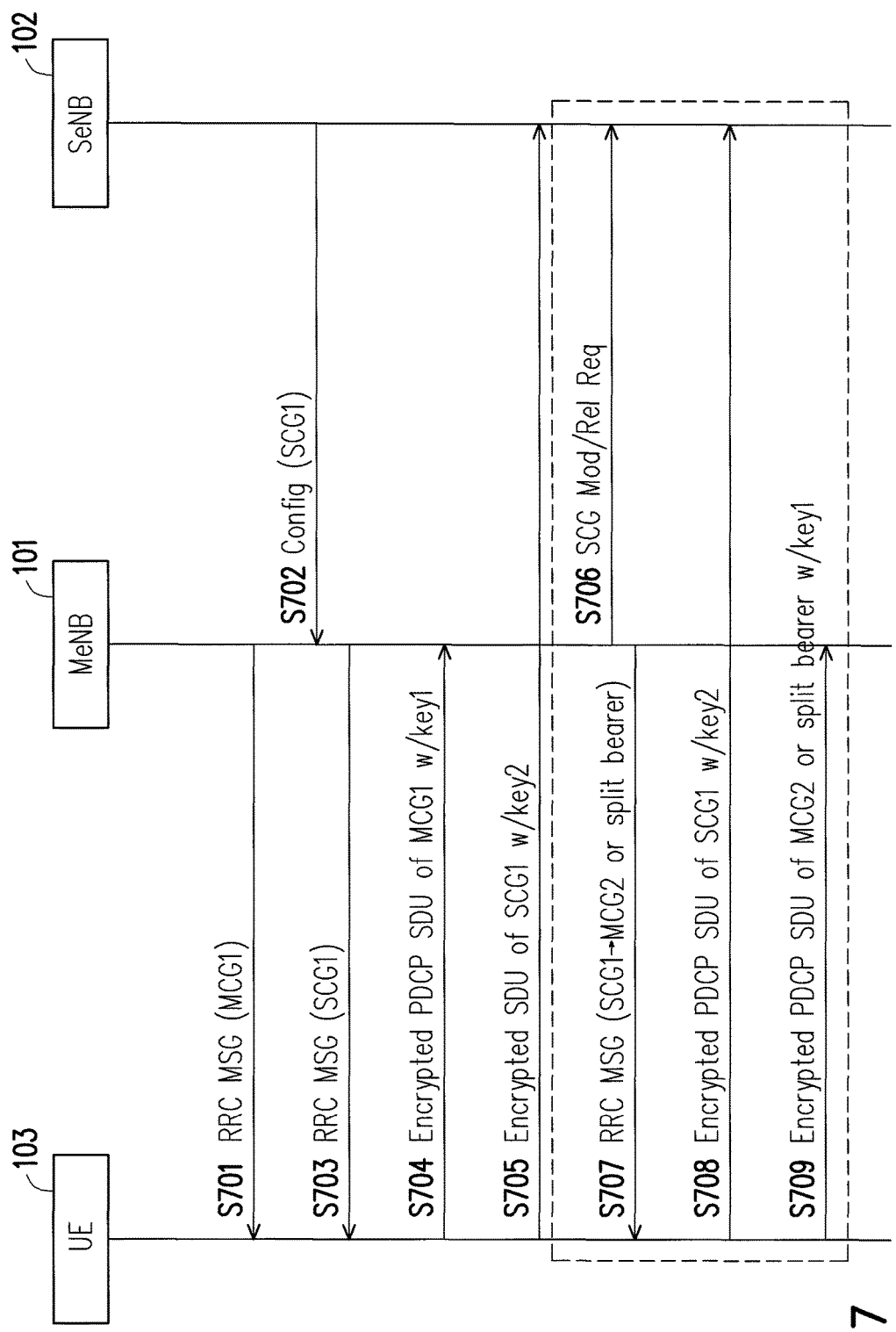
FIG. 7 illustrates a first exemplary embodiment of the disclosure.

FIG. 7 illustrates a first exemplary embodiment of the disclosure. The first exemplary embodiment is directed to a UE side response to a change from a SCG bearer to either a MCG bearer or a split bearer. The scenario of FIG. 7 could also be illustrated by FIG. 1. In step S701, a MeNB would transmit to the UE a first RRC message that would include a first configuration to establish a first MCG bearer used between the UE and the MeNB to communicate with each other. In step S702, a SeNB would transmit to the MeNB, over an inter-eNB interface, a configuration message that includes a second configuration to configure a first SCG bearer used between the SeNB and the UE to communicate with each other. The inter-eNB interface could be, for example, the X2 interface commonly used by a LTE communication system. In step S703, the MeNB would transmit to the UE a second RRC message that would include the second configuration to configure the first SCG bearer.

After the first SCG bearer and the first MCG bearer have been established by the UE to dually communicate with the MeNB and the SeNB, in step S704, the UE may encrypt, by using a first security key, a first plurality of Packet Data Convergence Protocol (PDCP) service data unit (SDU) to generate a first encrypted PDCP SDU which would then be transmitted to the MeNB via the first MCG bearer. The encryption of the first PDCP SDU would be accomplished by using a first transmitter hyper frame number (TX_HFN) and a first PDCP sequence number (SN) associated with the first PDCP SDU. The UE sets the first PDCP SN according to a first Next_PDCP_TX_SN before the encryption. The UE may encrypt a first plurality of PDCP SDUs of the first MCG bearer to generate the first plurality of encrypted PDCP SUDs which would then be transmitted to the MeNB, by using the first security key, the first TX_HFN and a PDCP SN associated with each of the first plurality of PDCP SDUs. The UE sets the PDCP SN associated with each of the first plurality PDCP SDUs according to the first Next_PDCP_TX_SN before encrypting each of the first plurality of PDCP SDUs. In step S705, the UE may encrypt, by using a second security key, a second PDCP SDU by using a second TX_HFN and a second PDCP SN associated with the second PDCP SDU to generate a second encrypted PDCP SDU which would then be transmitted to the SeNB via the first SCG bearer. The UE sets the second PDCP SN according to a second Next_PDCP_TX_SN. The second security key is used by the SeNB and the UE to communicate with each other. The UE may encrypt a second plurality of PDCP SDUs of the first SCG bearer to generate the second plurality of encrypted PDCP SUDs which would then be transmitted to the SeNB, by using the second security key, the second TX_HFN and a PDCP SN associated with each of the second plurality of PDCP SDUs. The UE set the PDCP SN associated with each of the second plurality PDCP SDUs according to the second Next_PDCP_TX_SN.

Steps S706~S709 would involve a change of the first SCG bearer into a second MCG bearer or a split bearer. In step S706, the MeNB may determine to reconfigure the first SCG bearer to be a second MCG bearer or a split bearer for the UE so the MeNB may transmit a message to the SeNB to release the first SCG bearer. In step S707, the MeNB transmits to the UE a third RRC message which includes necessary information to reconfigure the first SCG bearer to be the second MCG bearer or the split bearer. The step of S707 may cause a third PDCP SDU, encrypted by the second security key, the second TX_HFN, and a third PDCP SN associated with the third PDCU SDU, to be unsuccessfully transmitted from the UE to the SeNB as shown in step S708 since the UE stops transmitting any PDCP SDU of the first SCG bearer to the SeNB before successfully transmitting the encrypted third PDCP SDU upon reconfiguration of the first SCG bearer to be the second MCG bearer or the split bearer. In step S709, after reconfiguring the first SCG bearer to be the second MCG bearer or the split bearer according to the third RRC message, the UE would then encrypt a fourth PDCP SDU of the second MCG bearer or the split bearer by using the first security key as well as the second TX_HFN and a fourth PDCP SN associated with the fourth PDCP SDU and subsequently transmit to the MeNB the encrypted fourth PDCP SDU. The UE sets the fourth PDCP SN according to the second Next_PDCP_TX_SN. In other words, the UE keeps using the second TX_HFN and the second Next_PDCP_TX_SN of the first SCG bearer for the second MCG bearer or the split bearer. Accordingly the MeNB sets its RX_HFN and Next_RX_PDCP_SN of the second MCG bearer or the split bearer to an RX_HFN and a Next_RX_PDCP_SN of the first SCG bearer respectively. The MeNB may receive the RX_HFN and Next_RX_PDCP_SN of the first SCG bearer from the SeNB for receiving the encrypted fourth PDCP SDU. Alternatively the UE uses a third TX_HFN and a third Next_TX_PDCP_SN which are set to initial values (e.g. 0 s) by the UE for the second MCG bearer or the split bearer in response to step S707. In step 709, the UE would then encrypt the fourth PDCP SDU by using the first security key as well as the third TX_HFN and the fourth PDCP SN and subsequently transmit to the MeNB the encrypted fourth PDCP SDU. Before the encryption, the UE sets the fourth PDCP SN according to the third Next_PDCP_TX_SN. Accordingly the MeNB sets the RX_HFN and Next_RX_PDCP_SN of the second MCG bearer or the split bearer to initial values (e.g. 0 s). It is noted the change of the first SCG bearer into a second MCG bearer or a split bearer may or may not involve SeNB release.

Prior to or subsequent to step S708, the UE may attempt to re-transmit the third PDCP SDU by encrypting, using the first security key, the second TX_HFN and the third PDCP SN associated with the third PDCP SDU and were used in communication with the SeNB, to generate a fifth encrypted PDCP SDU. In this way, the first exemplary embodiment has provided a signaling mechanism to handle the SCG bearer change as well as a re-transmission mechanism to ensure that no data is lost. Alternatively the UE may attempt to re-transmit the third PDCP SDU by encrypting, using the first security key, the third TX_HFN and a fifth PDCP SN. The UE sets the fifth PDCP SN according to the third Next_PDCP_TX_SN before the encryption. It is noted that the UE may not attempt to re-transmit the third PDCP SDU since the UE does not support re-transmission of the third PDCP SDU or it may be late for the MeNB to receive the third PDCP SDU due to that the third PDCP SDU is real-time data.

Possible parameters used by the aforementioned bearer configurations are described by TS 36.300 which is incorporated by reference.

Figure 8:
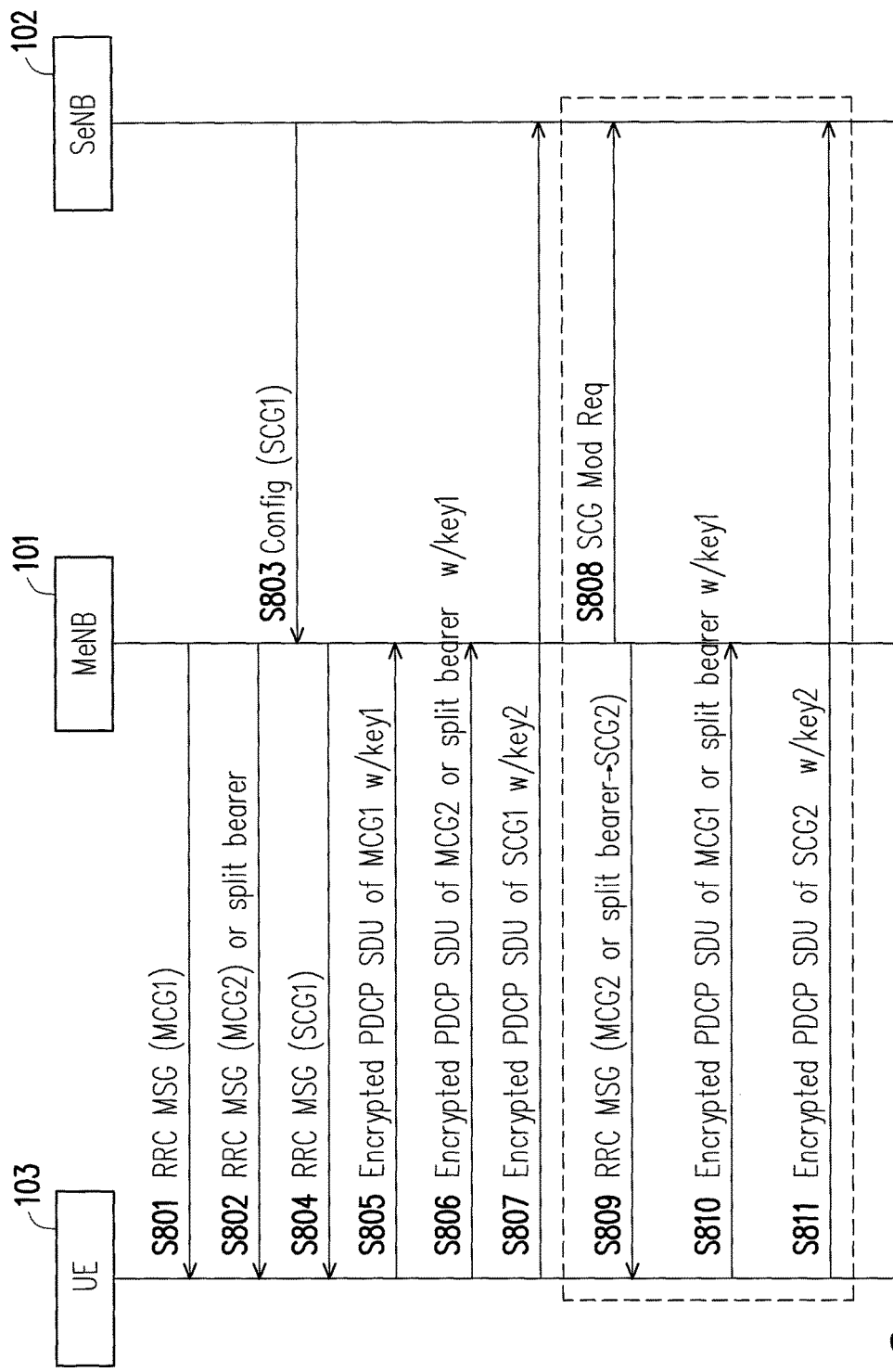
FIG. 8 illustrates a second exemplary embodiment of the disclosure.

FIG. 8 illustrates a second exemplary embodiment of the disclosure. The second exemplary embodiment is directed to a UE side in response to a change from either a MCG bearer or a split bearer to a SCG bearer. The scenario of FIG. 8 could also be illustrated by FIG. 1. In step S801, the MeNB may transmit a first RRC message that contains necessary information for the UE to establish a first MCG bearer. In step S802, the MeNB may transmit a second RRC message that contains necessary information for the UE to establish a second MCG bearer or a split bearer. In step S803, the SeNB may transmit a first configuration message that includes a first SCG configuration for communication between the SeNB and the UE. In response to receiving the first configuration message, in step S804 the MeNB may transmit a third RRC message that contains necessary information for the UE to establish the first SCG bearer.

After the first MCG bearer, the second MCG bearer or the split bearer, and the first SCG bearer have been established, in step S805 the UE may encrypt a first PDCP SDU by using a first security key, a first TX_HFN and a first PDCP SN associated with the first PDCP SDU to generate an encrypted first PDCP SDU which would subsequently be transmitted to MeNB via the first MCG bearer. The first security key is used for communication between the UE and the MeNB. The UE sets the first PDCP SN according to a first Next_PDCP_TX_SN. In step S806, the UE may encrypt a second PDCP SDU of the second MCG bearer or the split bearer by using the first security key, a second TX_HFN and a second PDCP SN associated with the second PDCP SDU to generate an encrypted second PDCP SDU which would subsequently be transmitted to MeNB. The UE sets the second PDCP SN according to a second Next_PDCP_TX_SN before the encryption. In step S807, the UE may encrypt a third PDCP SDU by using the second security key, a third TX_HFN and a third PDCP SN associated with the third PDCP SDU to generate an encrypted third PDCP SDU which would subsequently be transmitted to the SeNB via the first SCG bearer. The UE sets the third PDCP SN according to a third Next_PDCP_TX_SN before the encryption.

Steps S808~S811 would involve a change of the second MCG bearer or split bearer into a second SCG bearer. In step S808, the MeNB may determine to reconfigure the second MCG bearer or the split bearer to be the second SCG bearer by transmitting a message to request addition of the second SCG bearer for the UE. In step S809, the MeNB transmits to the UE a fourth RRC message that contains necessary information for the UE to reconfigure the second MCG bearer or split bearer to be the second SCG bearer. In step S810, during the reconfiguration of the second MCG bearer or the split bearer, the UE may encrypt a fourth PDCP SDU of the second MCG bearer or split the bearer by using the first security key, a second TX_HFN and a fourth PDCP SN associated with the fourth PDCP SDU, but the encrypted fourth PDCP SDU would not be successfully transmitted to the MeNB. In step S811, after reconfiguring the second MCG bearer or the split bearer into the second SCG bearer, the UE may encrypt a fifth PDCP SDU by using the second security key, the second TX_HFN and a fifth PDCP SN associated with the fifth PDCP SDU to generate an encrypted fifth PDCP SDU. The UE sets the fifth PDCP SN according to the second Next_PDCP_TX_SN before the encryption. In other words, the UE keeps using the second TX_HFN and the second Next_PDCP_TX_SN of the second MCG bearer or the split bearer for the second SCG bearer. The UE would then transmit the encrypted fifth PDCP SDU to the SeNB via the second SCG bearer. Accordingly the SeNB sets its Rx_HFN and Next_RX_P-DCP_SN of the second SCG bearer to an Rx_HFN and a Next_RX_PDCP_SN of the second MCG bearer or the split bearer respectively. The SeNB may receive the Rx_HFN and Next_RX_PDCP_SN of the second MCG bearer or the split bearer from the MeNB. Alternatively the UE uses a fourth TX_HFN and a fourth Next_RX_PDCP_SN which are set to an initial value (e.g. 0) for the second SCG bearer. In step S811, after reconfiguring the second MCG bearer or the split bearer into the second SCG bearer, the UE may encrypt the fifth PDCP SDU by using the second security key, the fourth TX_HFN and the fifth PDCP SN associated with the fifth PDCP SDU and subsequently transmits the encrypted fifth PDCP SDU. The UE sets the fifth PDCP SN according to the fourth Next_PDCP_TX_SN before the encryption. Accordingly the SeNB sets the RX_HFN and Next_RX_PDCP_SN of the second SCG bearer to initial values (e.g. 0 s).

Prior to or subsequent to step S811, the UE may attempt to re-transmit the fourth PDCP SDU which has been unsuccessfully transmitted previously by encrypting, using the second security key, the second TX_HFN and the fourth PDCP SN, which are associated with the fourth PDCP SDU and were used in communication with the MeNB, to generate the encrypted fourth PDCP SDU. In this way, the second exemplary embodiment has provided a signaling mechanism to handle a MCG/split bearer change to a SCG bearer as well as a re-transmission mechanism to ensure that no data would be lost. Alternatively the UE may attempt to re-transmit the fourth PDCP SDU by encrypting, using the second security key, the fourth TX_HFN and a sixth PDCP SN. The UE sets the sixth PDCP SN according to the fourth Next_PDCP_TX_SN before the encryption. It is noted that the UE may not attempt to re-transmit the third PDCP SDU since the UE does not support re-transmission of the fourth PDCP SDU or it may be late for the SeNB to receive the fourth PDCP SDU due to that the fourth PDCP SDU is real-time data.

Figure 9A:
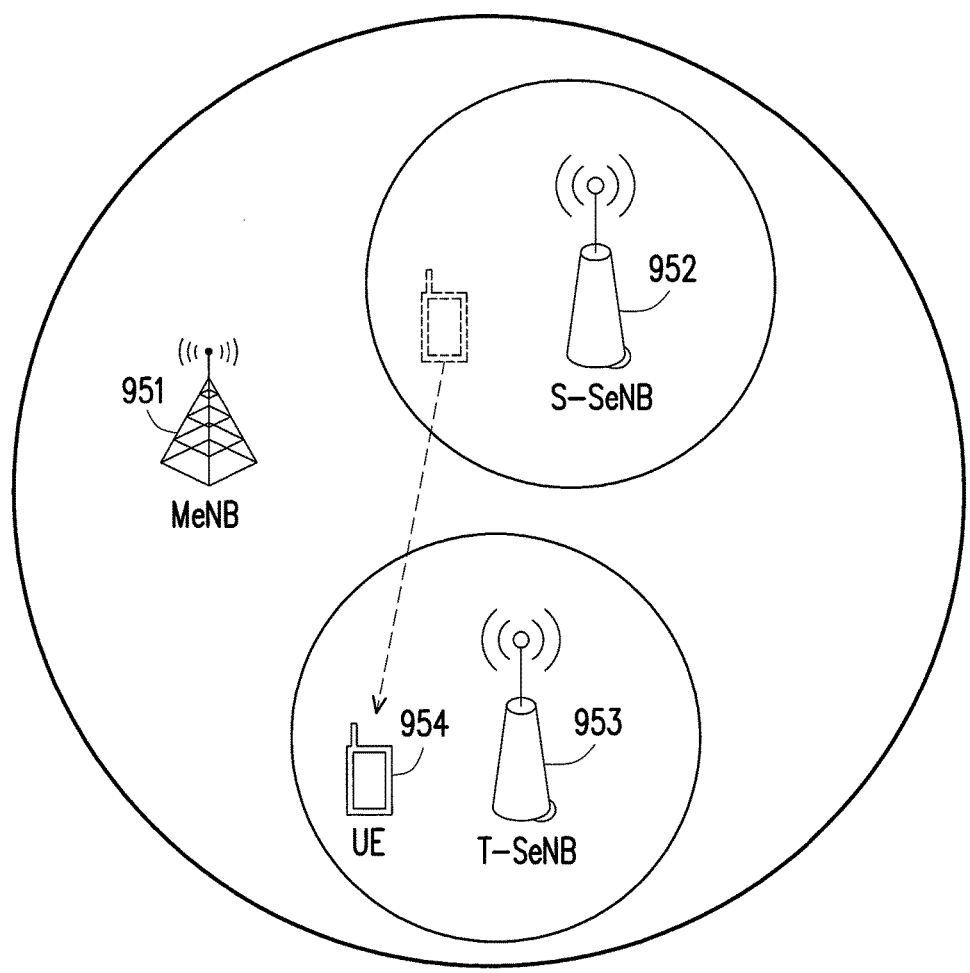
FIG. 9A illustrates a scenario of altering a SCG bearer as a result of a SeNB change in accordance with the third exemplary embodiment of the disclosure.

FIG. 9A illustrates a scenario of altering a SCG bearer as a result of a SeNB change in accordance with a third exemplary embodiment of the disclosure. The exemplary communication system of FIG. 9A would include at least but not limited to a MeNB 951, a S-SeNB 952, a T-SeNB 953, and a UE 954 which would attempt to simultaneously connect to the MeNB 951 and one of the S-SeNB 952 and the T-SeNB 953. The third exemplary embodiment would involve the UE 954 changing its connection from the S-SeNB 952 to the T-SeNB 953 while keeping its connection to the MeNB 951.

Figure 9B:
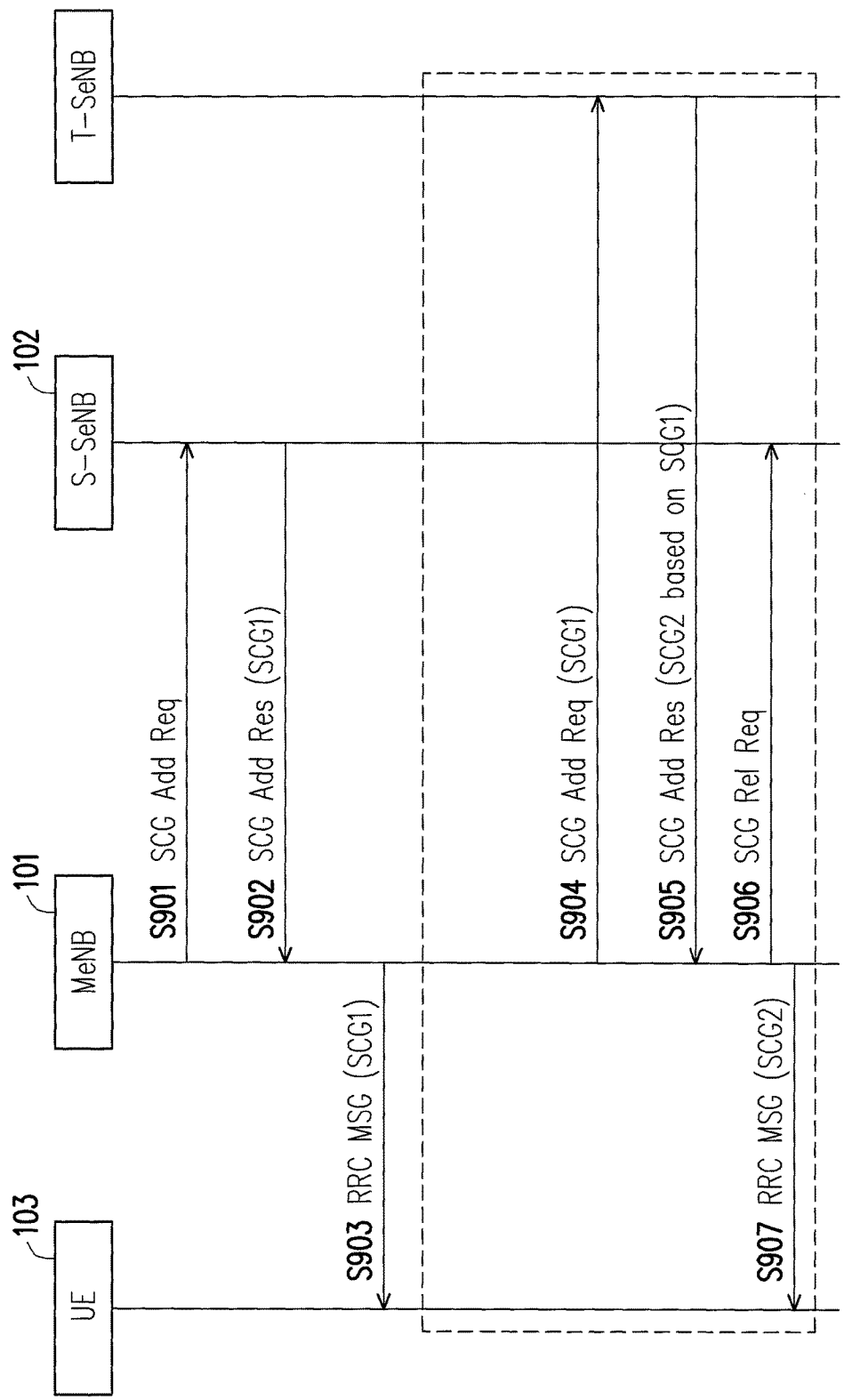
FIG. 9B illustrates a third exemplary embodiment of the disclosure.

FIG. 9B illustrates the signaling diagram of third exemplary embodiment which is directed to a change from a first SCG bearer to a second SCG bearer in response to a change of serving SeNB. In step S901, the MeNB may transmit to the S-SeNB a first SCG addition request message to request addition of the SeNB for establishing a first SCG bearer for the UE. The first SCG addition request message would request the S-SeNB to allocate radio resource of a cell of the S-SeNB to communicate with the UE. In response to receiving the first SCG addition request message, in step S902, the S-SeNB would generate a first SCG configuration for configuring the first SCG bearer to the UE. The S-SeNB would then transmit to the MeNB a first SCG addition response message which includes the first SCG configuration for establishing the first SCG bearer. In response to receiving the first SCG addition response message, in S903 the MeNB would transmit to the UE a first RRC message which includes the first SCG configuration for the UE to establish the first SCG bearer.

After the SCG bearer has been established, steps S904~S907 involve the SCG change from the S-SeNB to T-SeNB, i.e. a SeNB change. In step S904, the MeNB may have determined to perform the SeNB change and subsequently to initiate the SeNB change by transmitting to the T-SeNB a second SCG addition request message which would request addition of the T-SeNB as a serving SeNB for the UE. In order to provide the first SCG configuration for the T-SeNB to establish the second SCG bearer, the MeNB would need to store the first SCG configuration when the first SCG configuration was received from the S-SeNB. In step S904, the MeNB would transmit to the T-SeNB the second SCG addition request message that includes the first SCG configuration. In step S905, in response to receiving the second SCG addition request message, the T-SeNB would transmit to the MeNB a second SCG addition response message which includes a second SCG configuration that is based on the first SCG configuration. In step S906, the MeNB subsequently transmits to the S-SeNB a first SCG release request message which would effectively release the S-SeNB. In response to receiving the second SCG addition response message, in step S907, the MeNB would transmit to the UE a second RRC message that includes the second SCG configuration in order to establish the second SCG bearer.

It should be noted that the second SCG configuration could be generated based on the first SCG configuration by having the second SCG configuration to include only information that is different from the first SCG configuration. For example, if the first SCG configuration includes {configuration 1, configuration 2, and configuration 3}, the second SCG configuration would include {configuration 2'} since the T-SeNB may attempt to apply the same configuration 1 and configuration 3 as the S-SeNB but change configuration 2 to configuration 2'. For example, the configuration 1 may be a DRB identity and the configuration 3 may be an EPS bearer identity. The configuration 2 may be a configuration related to Medium Access Control (MAC). Descriptions of the aforementioned configurations as well as possible parameters of the first SCG configuration and the second SCG configuration are described in TS 36.300 and TS 36.331 which are incorporated by reference.

Figure 10:
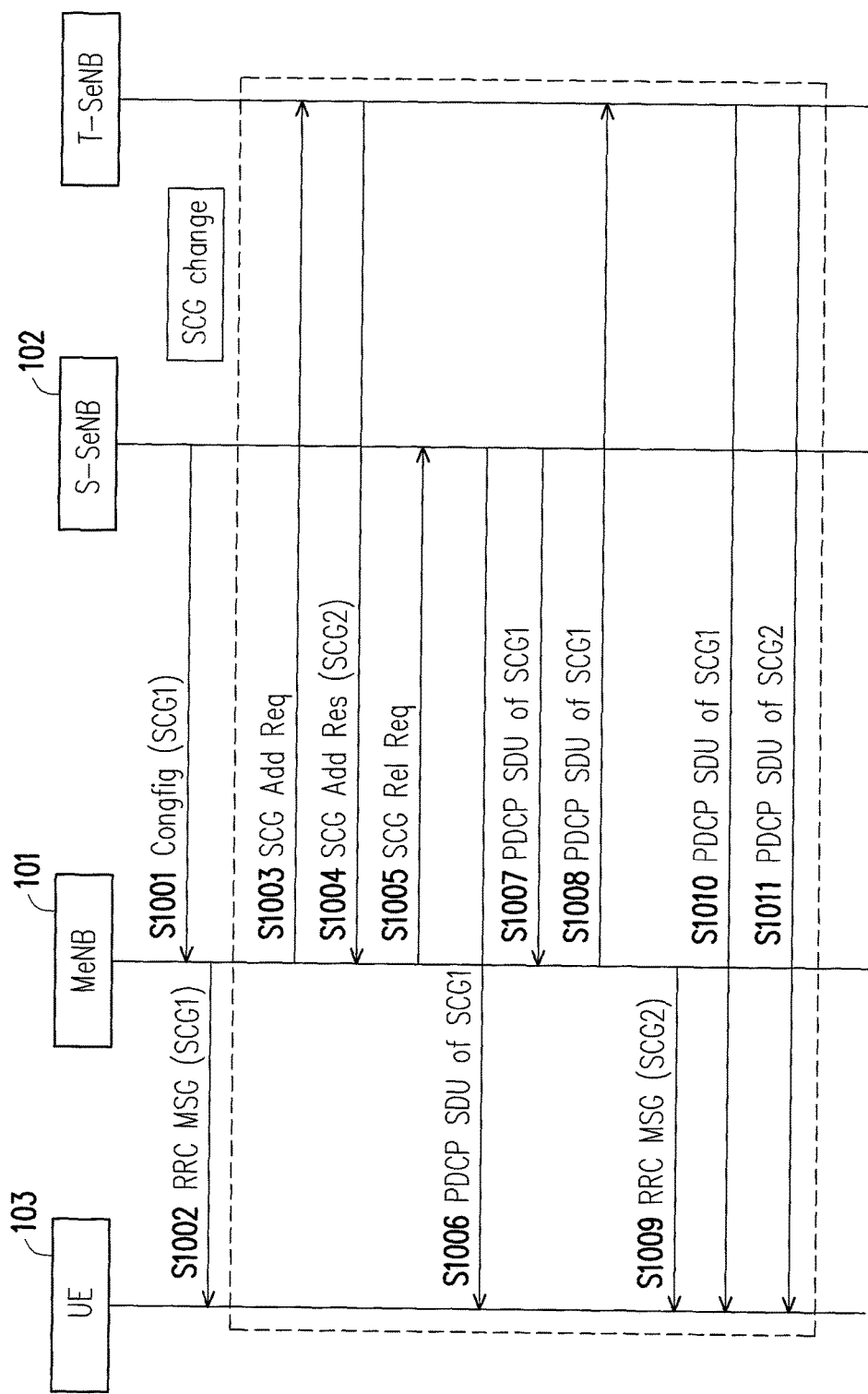
FIG. 10 illustrates a fourth exemplary embodiment of the disclosure.

FIG. 10 illustrates a fourth exemplary embodiment which is an extension of the scenario of altering a SCG bearer as a result of a SeNB change and is similar to the third exemplary embodiment of the disclosure. In step S1001, an S-SeNB would transmit a first SCG configuration message to a MeNB. In step S1002, the MeNB would transmit to a UE a first RRC message which includes the first SCG configuration. The UE would establish the first SCG bearer according to the first SCG configuration, steps S1003~S1011 would involve a SCG change from the S-SeNB to a T-SeNB, i.e. a SeNB change.

In step S1003, the MeNB may determine the SeNB change and thus transmit to the T-SeNB a SCG addition request message which requests addition of the T-SeNB as a serving SeNB for the UE. In response to receiving the SCG addition request message, in step S1004, the T-SeNB would transmit a SCG addition response message which includes a second SCG configuration for establishing a second SCG bearer between the T-SeNB and the UE. In response to the event of S1004, the MeNB transmits to the S-SeNB a SCG release request which requests release of S-SeNB for the UE as step S1005. In step S1006, the S-SeNB would encrypt a first PDCP SDU into a first encrypted PDCP SDU and transmit the first encrypted PDCP SDU of the first SCG bearer, to the UE but the release of the first SCG bearer back in step S1005 would cause the first PDCP SDU to be not received by the UE. In step S1007, the S-SeNB would transmit the first PDCP SDU to the MeNB. In response to the event of S1007, in step S1008 the MeNB would route the first PDCP SDU to the T-SeNB, and also in step S1009 the MeNB would transmit a second RRC message which includes the second SCG configuration in order to reconfigure the first SCG bearer to be the second SCG bearer for communication between the T-SeNB and the UE. In step S1010, the T-SeNB would encrypt the first PDCP SDU into a second encrypted PDCP SDU and transmit to the UE the second encrypted PDCP SDU so that the first PDCP SDU which is not successfully received by the UE is retransmitted to the UE by the T-SeNB. It is noted that the S-SeNB and the T-SeNB use different security keys to encrypt the first PDCP SDU. In step S1011, the T-SeNB would encrypt a second PDCP SDU of the second SCG bearer into a third encrypted PDCP SDU and transmit the third encrypted PDCP SDU to the UE. It is noted that the S-SeNB may not perform step S1007 for retransmission of the first PDCP SDU in the MeNB for many reasons. For example, it may be late for the UE to receive the first PDCP SDU from the T-SeNB since the first PDCP SDU is real-time data or the S-SeNB does not support forwarding of the first PDCP SDU to the MeNB.

Moreover, after the T-SeNB establishes the second SCG bearer for the UE, the T-SeNB would encrypt a PDCP SDU of the second SCG bearer into an encrypted PDCP SDU transmitted using a security key, a TX_HFN and a Next_PDCP_TX_SN. The T-SeNB may initialize the TX_HFN and Next_PDCP_TX_SN by setting the TX_HFN and Next_PDCP_TX_SN to TX_HFN and Next_PDCP_TX_SN of the first SCG bearer respectively before using the second SCG bearer. Thus, in response to the determination in step S1005, the S-SeNB may transmit to the MeNB information indicating the TX_HFN and Next_PDCP_TX_SN of the first SCG bearer associated to a PDCP entity of the first SCG bearer. The MeNB would forward the information to the T-SeNB. In this case the UE keeps using a RX_HFN and a Next_PDCP_RX_SN of the first SCG bearer for decrypting the encrypted PDCP SDU received from the T-SeNB after step S1009. Alternatively the T-SeNB may set the TX_HFN and the Next_PDCP_TX_SN to initial values (e.g. zeros) for the second SCG bearer in response to step S1003. In this case, the UE also initializes the RX_HFN and the Next_PDCP_RX_SN to the initial values (e.g. 0 s) for the second SCG bearer in response to step S1009.

Assuming that the first PDCP SDU were a first group of PDCP SDUs, the PDCP SNs associated with the first group of PDCP SDUs can be each individual PDCP SNs or could be derived from a starting PDCP SN of the PDCP SNs. In other words, the starting PDCP SN could be the lowest PDCP SN of a PDCP SDU which has not been transmitted successfully. The PDCP SNs associated with the first group of PDCP SDUs could also be derived from a bitmap or other forms. According to the third as well as the fourth exemplary embodiments in general, a T-SeNB may transmit or retransmit a plurality of PDCP SDUs to the UE in order to avoid losses of PDCP SDUs as a result of the SCG change.

The fourth exemplary embodiment may further include the S-SeNB transmitting to the MeNB RX_HFN(s) and PDCP SN(s) that are associated with PDCP SDU(s) which is associated with the first SCG bearer but not received by the MeNB in response to the SCG release request message. The MeNB in response to receiving the RX_HFN(s) and the PDCP SN(s) may transmit them to the T-SeNB. The T-SeNB may transmit information to the UE to indicate that the PDCP SDU(s) have not been received according to the PDCP SN(s) of the PDCP SDU(s) if needed. Subsequently the UE may (re-)transmit the PDCP SDU(s) in order to avoid losses of the PDCP SDU(s) as a result of the SCG change by encrypting the PDCP SDU(s) into encrypted PDCP SDU(s) using a security key known by the T-SeNB and (re-)transmitting the encrypted PDCP SDU(s) to the S-SeNB. The security key known by the T-SeNB is different from another security key was used for communication between the UE and the S-SeNB.

Figure 11:
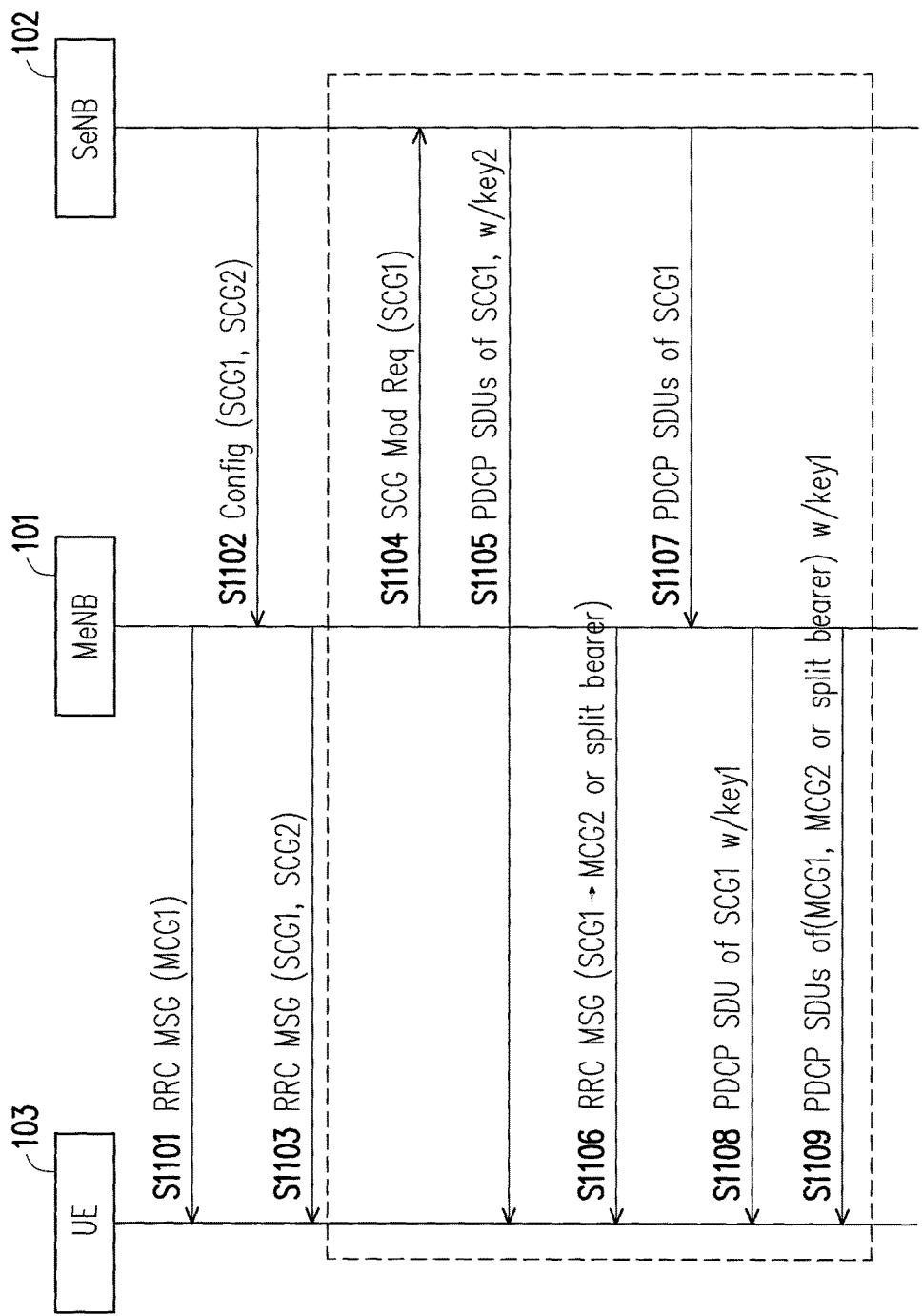
FIG. 11 illustrates a fifth exemplary embodiment of the disclosure.

FIG. 11 illustrates a fifth exemplary embodiment which is directed to a scenario involving a change from a SCG bearer into a MCG bearer a split bearer among multiple existing radio bearers. The scenario of the fifth exemplary embodiment could be represented by FIG. 1. In step S1101, the MeNB would transmit to the UE a first RRC message which would include a first MCG configuration for establishing a first MCG bearer. A first security key is used for encrypting and decrypting data for communications between the MeNB and the UE. In step S1102, the MeNB would receive from the SeNB a configuration message which includes a first SCG configuration, a second SCG configuration. The first SCG configuration and the second SCG configuration are for establishing the first SCG bearer and the second SCG bearer respectively between the UE and the SeNB. A second security key is used for encrypting and decrypting data for communications between the SeNB and the UE. In step S1103, in response to receiving the configuration message from the SeNB, the MeNB would transmit to the UE a second RRC message which would include the first SCG configuration and the second SCG configuration. Assuming that the first SCG bearer, the second SCG bearer, and the first MCG bearer have been established, step S1104~1108 involve a change to a SCG bearer.

In step S1104, the MeNB determines to reconfigure the first SCG bearer to be a second MCG bearer or a split bearer and would transmit to the SeNB a SCG modification request message which would release the first SCG bearer. In step S1105, the SeNB would encrypt a first PDCP SDU into a first encrypted PDCP SDU by the second key and transmit to the UE the first encrypted PDCP SDU via the first SCG bearer; however, the determination back in step S1104 would cause the first encrypted PDCP SDU to be not successfully received by the UE. In response to step S1104, in step S1106 the MeNB may transmit to the UE a third RRC message that includes necessary information to reconfigure the first SCG bearer to be the second MCG bearer or the split bearer. In step S1107, the SeNB would transmit the first PDCP SDU to the MeNB. In response to receiving the first PDCP SDU, in step S1108, the MeNB would encrypt, by using the first security key, the first PDCP SDU into a second encrypted PDCP SDU and transmit the encrypted second PDCP SDU to the UE. The first security key is used for communication between the MeNB and the UE. In step S1109, the MeNB would encrypt a third PDCP SDU of the first MCG bearer into a third encrypted PDCP SDU and a fourth PDCP SDU of the second MCG bearer or the split bearer into a fourth encrypted PDCP SDU by the first security key, and transmit to the UE the third and the fourth PDCP SDUs via the first MCG bearer and the second MCG bearer respectively. It is noted that the SeNB may not perform step S1107 for retransmission of the first PDCP SDU in the MeNB for many reasons. For example, it may be late for the UE to receive the first PDCP SDU from the MeNB since the first PDCP SDU is real-time data or the SeNB does not support forwarding of the first PDCP SDU to the MeNB.

Moreover, after the MeNB configures the second MCG bearer or the split bearer for the UE, the MeNB would encrypt a PDCP SDU into an encrypted PDCP SDU transmitted via the second MCG bearer or the split bearer using the first security key, a TX_HFN and a Next_PDCP_TX_SN. The MeNB may initialize the TX_HFN and Next_PDCP_TX_SN to TX_HFN by setting the TX_HFN and Next_PDCP_TX_SN to TX_HFN and Next_PDCP_TX_SN of the first SCG bearer respectively before the encryption. Thus, in response to the determination in step S1104, the SeNB may transmit to the MeNB information indicating the TX_HFN and Next_PDCP_TX_SN of the first SCG bearer. The MeNB would set the TX_HFN and Next_PDCP_TX_SN according to the information. In this case the UE sets a RX_HFN and a Next_PDCP_RX_SN of the second MCG bearer or the split bearer to a RX_HFN and a Next_PDCP_RX_SN of the first SCG bearer respectively for decrypting the encrypted PDCP SDU received via the second MCG bearer or the split bearer after step S1106. Alternatively the MeNB may initialize TX_HFN and the Next_PDCP_TX_SN to initial values (e.g. zeros) for the second MCG bearer or the split bearer in response to step S1106. In this case, the UE also initializes the RX_HFN and Next_PDCP_RX_SN to the initial values (e.g. zeros) for the second MCG bearer or the split bearer in response to step S1106.

Assuming that the first PDCP SDU were a first group of PDCP SDUs, for some of the first group of PDCP SDUs were not successfully delivered back in step S1105, the PDCP SNs associated with the first group of PDCP SDUs can be each individual PDCP SNs or could be derived from a starting PDCP SN of the PDCP SNs. In other words, the starting PDCP SN could be the lowest PDCP SN of a PDCP SDU which has not been transmitted successfully. The PDCP SNs associated with the first group of PDCP SDUs could also be derived from a bitmap or other forms. Alternatively, the MeNB may set the PDCP SNs associated with the first group of PDCP SDUs according to the Next_PDCP_TX_SN which is initialized to an initial value (e.g. zero). In this case, the SeNB does not need to provide information of the PDCP SNs. The MeNB may transmit or re-transmit the first group of PDCP SDUs to the UE in order to avoid losses of PDCP SDUs as a result of a SCG bearer change to a MCG bearer or split bearer.

The fifth exemplary embodiment may further include the SeNB transmitting to the MeNB RX_HFN(s) and PDCP SN(s) that are associated with PDCP SDU(s) which is associated with the first SCG bearer but not received by the SeNB in response to the SCG modification request message of step S1104. The MeNB may transmit information to the UE to indicate that the PDCP SDUs have not been received according to the PDCP SNs of the PDCP SDUs. Subsequently the UE may (re-)transmit the PDCP SDUs in order to avoid losses of the PDCP SDUs as a result of a change of bearer type by encrypting the PDCP SDU(s), using the first security key, into encrypted PDCP SDU(s).

Figure 12:
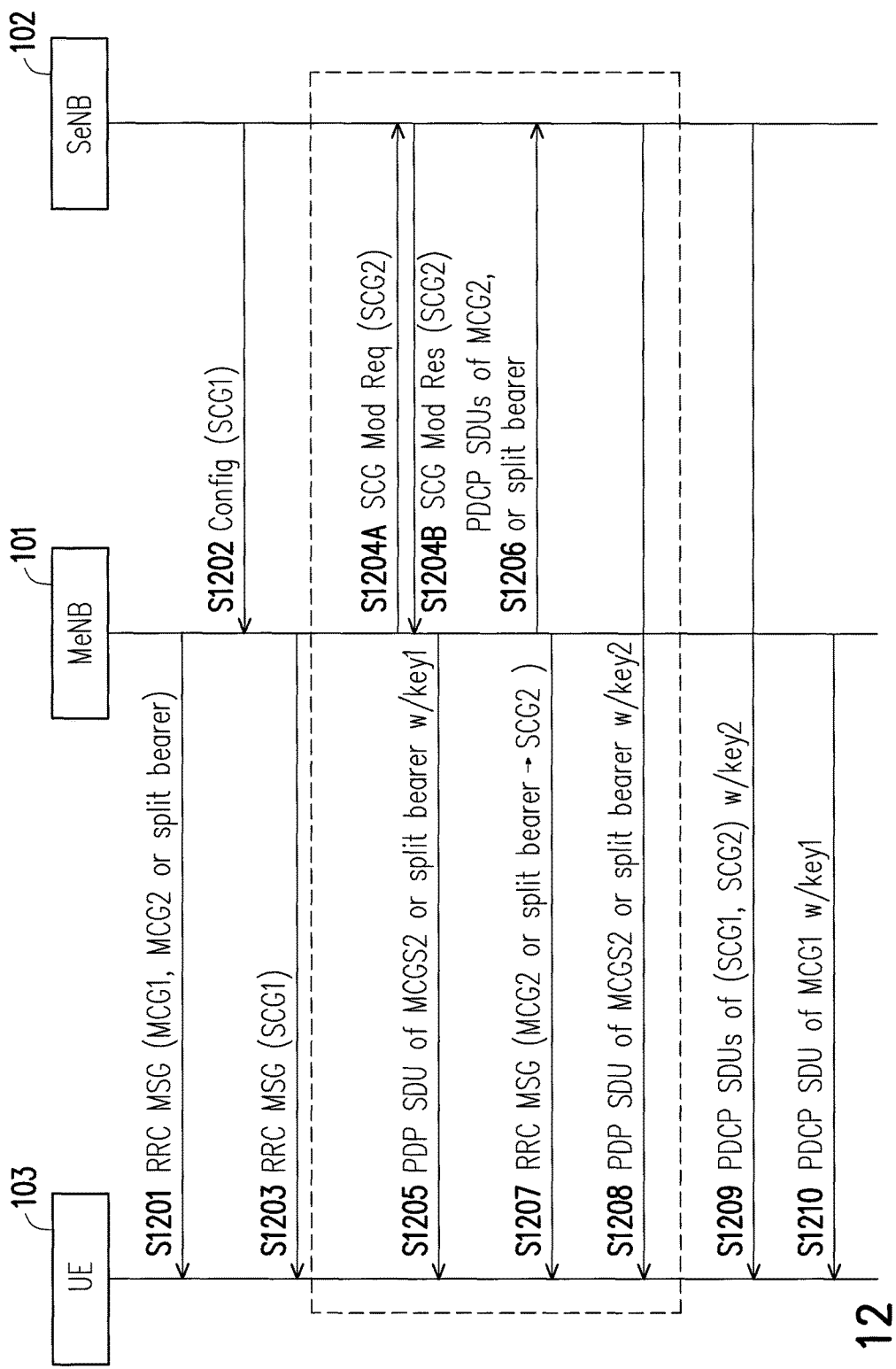
FIG. 12 illustrates a sixth exemplary embodiment of the disclosure.

FIG. 12 illustrates a sixth exemplary embodiment which is directed to a scenario involving a change from either a MCG bearer or a split bearer into a SCG bearer among multiple existing radio bearers. The scenario of the sixth exemplary embodiment could be represented by FIG. 1. In step S1201, the MeNB would transmit a first RRC message or first two RRC messages of which each includes necessary information to establish a first MCG bearer and either a second MCG bearer or a split bearer. A first security key is used by the UE and the SeNB respectively for encrypting and decrypting data for communications between the UE and the MeNB. In step S1202, the SeNB would transmit a configuration message that includes a first SCG configuration. A second security key is used by the UE and the SeNB respectively for encrypting and decrypting data for communications between the UE and the SeNB. In step S1203, in response to receiving the configuration message, the MeNB would transmit to the UE a second RRC message which includes necessary information to establish a first SCG bearer. After the first SCG bearer, the first MCG bearer, and the split bearer have been established, steps S1204~S1208 involve a change of a MCG bearer or a split bearer into a SCG bearer.

In step S1204A, the MeNB determines to reconfigure the second MCG bearer or the split bearer to be a second SCG bearer and would transmit to the SeNB a SCG modification request message which would establish a second SCG bearer. In step S1204B, the MeNB would receive an acknowledgment of the step S1204A by receiving a SCG modification response message from the SeNB. In step S1205, the MeNB would transmit to the UE a first PDCP SDU of the first MCG bearer or the split bearer which was encrypted by using the first security key, but the determination back in step S1204A to reconfigure the second MCG bearer or the split bearer to be the second SCG bearer would cause the first PDCP SDU not to be received successfully by the UE. In response to step S1205, the MeNB would in step S1206 transmit to the SeNB the first PDCP SDU. In step S1207, the MeNB would transmit to the UE a third RRC message that includes necessary information to reconfigure the second MCG bearer or the split bearer to be the second SCG bearer. In step S1208, the SeNB would encrypt the first PDCP SDU by using the second security key to generate a second encrypted PDCP SDU and would subsequently transmit the second encrypted PDCP SDU to the UE via the second SCG bearer. In step S1209, the SeNB may encrypt a third PDCP SDU of the first SCG bearer by using the second security key and subsequently transmit to the UE the third encrypted PDCP SDU, and encrypt the a fourth PDCP SDU of the second SCG bearer by using the second security key and subsequently transmit to the UE the fourth encrypted PDCP SDU. In step S1210, the MeNB may encrypt a fifth PDCP SDU of the first MCG bearer by using the first security key and subsequently transmit to the UE the fourth PDCP SDU. It is noted that the MeNB may not perform step S1206 for retransmission of the first PDCP SDU in the SeNB for many reasons. For example, it may be late for the UE to receive the first PDCP SDU from the SeNB since the first PDCP SDU is real-time data or the MeNB does not support forwarding of the first PDCP SDU to the SeNB.

Moreover, after the SeNB establishes the second SCG bearer for the UE, the SeNB would encrypt a PDCP SDU transmitted via the second SCG bearer using the second security key, a TX_HFN and a Next_PDCP_TX_SN. The SeNB may initialize the TX_HFN and Next_PDCP_TX_SN by setting the TX_HFN and Next_PDCP_TX_SN to TX_HFN and Next_PDCP_TX_SN of the second MCG bearer or the split bearer respectively before the encryption. Thus, the MeNB may indicate to the SeNB that the TX_HFN and Next_PDCP_TX_SN of the second MCG bearer or the split bearer either in step S1204A or in another message. The SeNB would set the TX_HFN and Next_PDCP_TX_SN according to the information for the second SCG bearer. In this case the UE sets a RX_HFN and a Next_PDCP_RX_SN of the second SCG bearer to a RX_HFN and a Next_PDCP_RX_SN of the second MCG bearer or the split bearer respectively for decrypting the encrypted PDCP SDU received via the second SCG bearer after step S1207. Alternatively the SeNB may initialize the TX_HFN and the Next_PDCP_TX_SN by setting the TX_HFN and the Next_PDCP_TX_SN to initial values (e.g. zeros) for the second SCG bearer in response to step S1207. In this case, the UE also initializes RX_HFN and the Next_PDCP_RX_SN to the initial values (e.g. zeros) for the second SCG bearer in response to step S1207.

Assuming that the first PDCP SDU were a first group of PDCP SDUs, for some of the first group of PDCP SDUs were not successfully delivered back in step S1205, the PDCP SNs associated with the first group of PDCP SDUs can be each individual PDCP SNs or could be derived from a starting PDCP SN of the PDCP SNs. In other words, the starting PDCP SN could be the lowest PDCP SN of a PDCP SDU which has not been transmitted successfully. The PDCP SNs associated with the first group of PDCP SDUs could also be derived from a bitmap or other forms received from the MeNB. According to the sixth exemplary embodiments in general, a SeNB may transmit or re-transmit a plurality of PDCP SDUs to the UE in order to avoid losses of PDCP SDUs as a result of a MCG bearer or a split bearer change to a SCG bearer. Alternatively, the SeNB may set the PDCP SNs associated with the first group of PDCP SDUs according to the Next_PDCP_TX_SN which is initialized to an initial value (e.g. zero). In this case, the MeNB does not need to provide information of the PDCP SNs.

The sixth exemplary embodiment may further include the MeNB transmitting to the SeNB RX_HFN(s) and PDCP SN(s) that are associated with PDCP SDU(s) which is associated with the second MCG bearer or the split bearer but not received by the MeNB in response to the SCG modification request message of step S1204A. The SeNB may transmit information to the UE to indicate that the PDCP SDUs have not been received according to the PDCP SNs of the PDCP SDUs if needed. Subsequently the UE may (re-)transmit the PDCP SDUs in order to avoid losses of the PDCP SDUs as a result of a change of bearer type by encrypting the PDCP SDU(s), using the second security key, into encrypted PDCP SDU(s).

Figure 13:
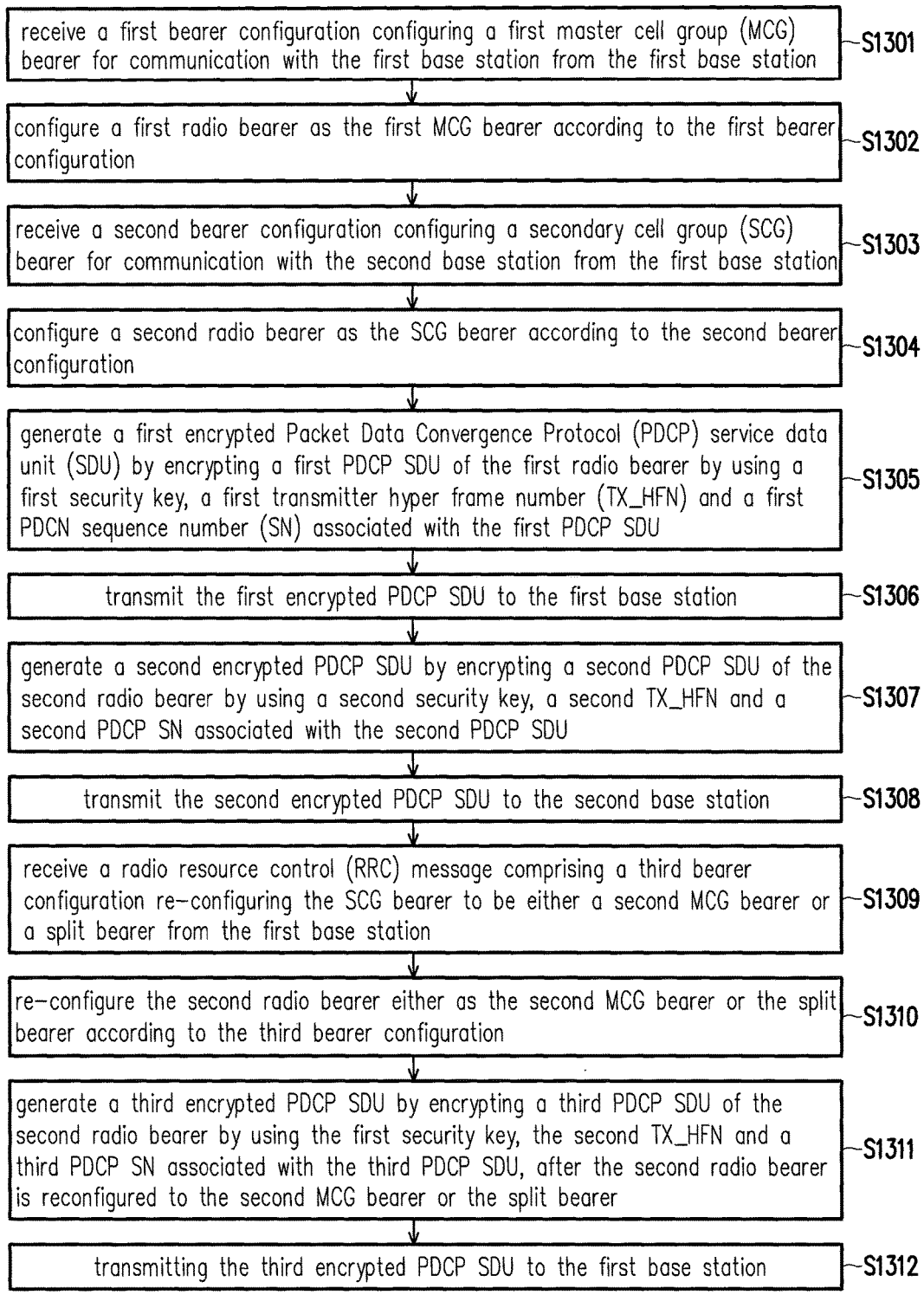
FIG. 13 illustrates a connection modification method from the perspective of a user equipment (UE) connected to multiple base stations.

FIG. 13 illustrates a connection modification method from the perspective of a user equipment (UE) capable of dually connecting to a first and a second base stations. The method is consistent with the first exemplary embodiment as aforementioned and would include S1301 receiving a first bearer configuration configuring a first master cell group (MCG) bearer for communication with the first base station from the first base station; S1302 configuring a first radio bearer as the first MCG bearer according to the first bearer configuration; S1303 receiving a second bearer configuration configuring a secondary cell group (SCG) bearer for communication with the second base station from the first base station; S1304 configuring a second radio bearer as the SCG bearer according to the second bearer configuration; S1305 generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCN sequence number (SN) associated with the first PDCP SDU; S1306 transmitting the first encrypted PDCP SDU to the first base station; S1307 generating a second encrypted PDCP SDU by encrypting a second PDCP SDU of the second radio bearer by using a second security key, a second TX_HFN and a second PDCP SN associated with the second PDCP SDU; S1308 transmitting the second encrypted PDCP SDU to the second base station; S1309 receiving a radio resource control (RRC) message comprising a third bearer configuration re-configuring the SCG bearer to be either a second MCG bearer or a split bearer from the first base station; S1310 re-configuring the second radio bearer either as the second MCG bearer or the split bearer according to the third bearer configuration; S1311 generating a third encrypted PDCP SDU by encrypting a third PDCP SDU of the second radio bearer by using the first security key, the second TX_HFN and a third PDCP SN associated with the third PDCP SDU, after the second radio bearer is reconfigured to the second MCG bearer or the split bearer; and S1312 transmitting the third encrypted PDCP SDU to the first base station.

Moreover, the third PDCP SDU would be encrypted using the second security key, the second TX_HFN, and the third PDCP SN to be transmitted to the second base station in response to or only in response to being unsuccessfully transmitted to the second base station before the second radio bear is reconfigured to be the second SCG bearer. Also, the third PDCP SN would be set according to a Next_PDCP_TX_SN associated with the SCG bearer.

Figure 14:
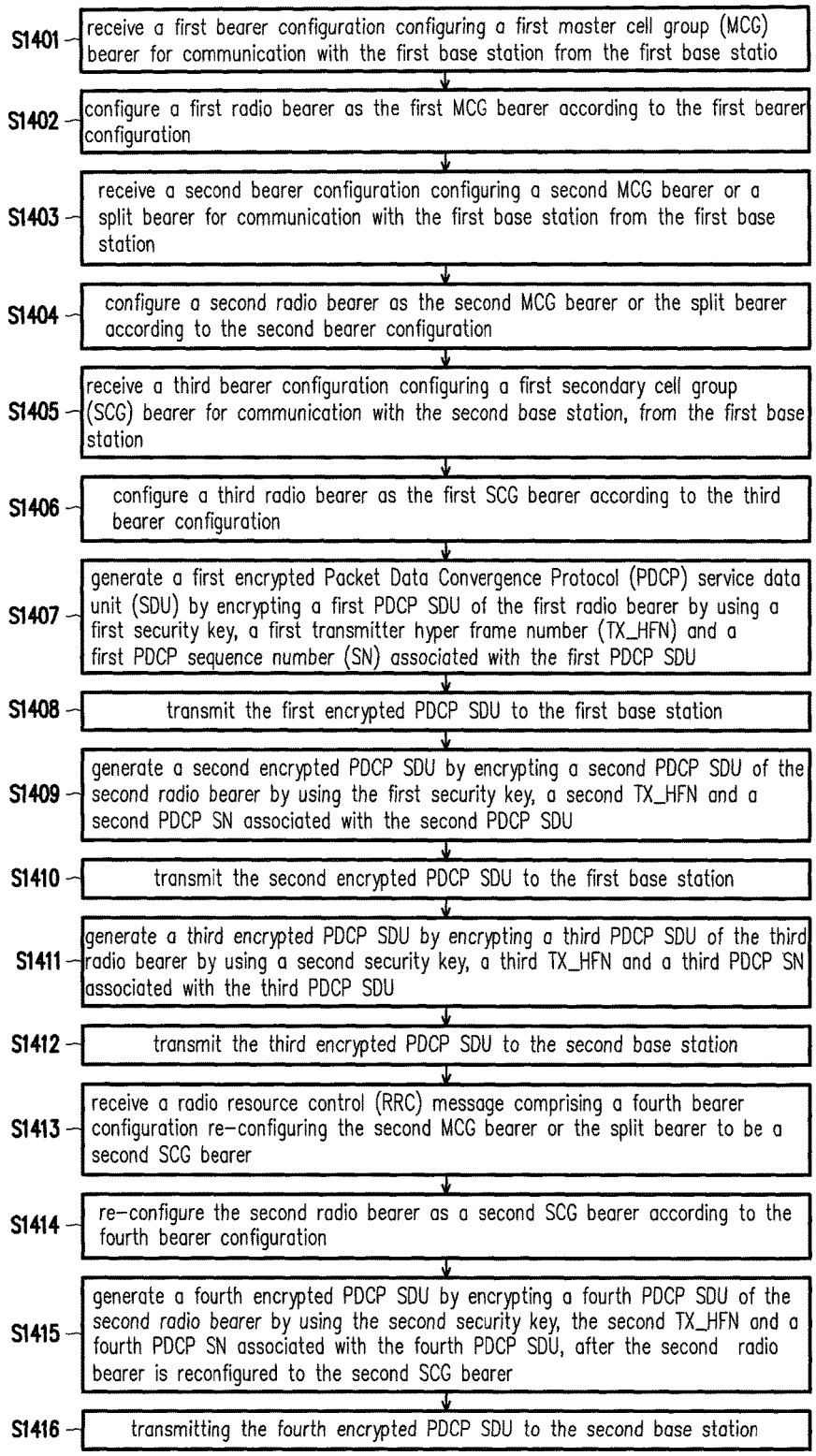
FIG. 14 illustrates a connection modification method from the perspective of a user equipment (UE) connected to multiple base stations.

FIG. 14 illustrates a connection modification method from the perspective of a user equipment (UE) capable of dually connecting to a first and a second base stations. The method is consistent with the second exemplary embodiment as aforementioned and would include S1401 receiving a first bearer configuration configuring a first master cell group (MCG) bearer for communication with the first base station from the first base station; S1402 configuring a first radio bearer as the first MCG bearer according to the first bearer configuration; S1403 receiving a second bearer configuration configuring a second MCG bearer or a split bearer for communication with the first base station from the first base station; S1404 configuring a second radio bearer as the second MCG bearer or the split bearer according to the second bearer configuration; S1405 receiving a third bearer configuration configuring a first secondary cell group (SCG) bearer for communication with the second base station, from the first base station; S1406 configuring a third radio bearer as the first SCG bearer according to the third bearer configuration; S1407 generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCP sequence number (SN) associated with the first PDCP SDU; S1408 transmitting the first encrypted PDCP SDU to the first base station; S1409 generating a second encrypted PDCP SDU by encrypting a second PDCP SDU of the second radio bearer by using the first security key, a second TX_HFN and a second PDCP SN associated with the second PDCP SDU; S1410 transmitting the second encrypted PDCP SDU to the first base station; S1411 generating a third encrypted PDCP SDU by encrypting a third PDCP SDU of the third radio bearer by using a second security key, a third TX_HFN and a third PDCP SN associated with the third PDCP SDU; S1412 transmitting the third encrypted PDCP SDU to the second base station; S1413 receiving a radio resource control (RRC) message comprising a fourth bearer configuration re-configuring the second MCG bearer or the split bearer to be a second SCG bearer; S1414 re-configuring the second radio bearer as a second SCG bearer according to the fourth bearer configuration; S1415 generating a fourth encrypted PDCP SDU by encrypting a fourth PDCP SDU of the second radio bearer by using the second security key, the second TX_HFN and a fourth PDCP SN associated with the fourth PDCP SDU, after the second radio bearer is reconfigured to the second SCG bearer; and S1416 transmitting the fourth encrypted PDCP SDU to the second base station.

Moreover the fourth PDCP SDU would be encrypted using the first security key, the second TX_HFN, and the fourth PDCP SN in response to or only in response to being unsuccessfully transmitted to the first base station before the second radio bearer is reconfigured as the second SCG bearer. Also the fourth PDCP SN would be set according to a Next_PDCP_TX_SN associated with the second MCG bearer or the split bearer.

Figure 15:
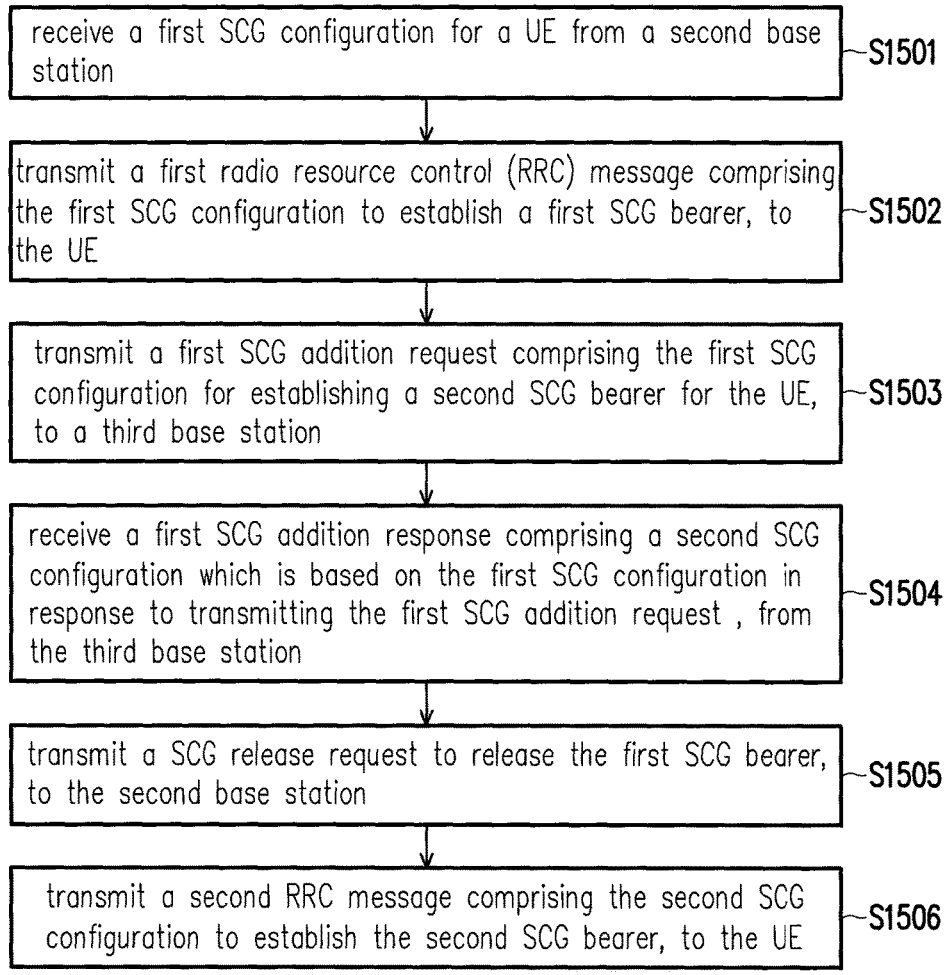
FIG. 15 illustrates a connection modification method that is from the perspective of a base station which provides service to a user equipment (UE) connected to multiple base stations.

FIG. 15 illustrates a connection modification method that is from the perspective of a first base station which serves a user equipment (UE) capable of dually connecting to the first base station and a second base station. The method is consistent with the third and fourth exemplary embodiments as aforementioned as would include S1501 receiving a first SCG configuration for a UE from a second base station; S1502 transmitting a first radio resource control (RRC) message comprising the first SCG configuration to establish a first SCG bearer, to the UE; S1503 transmitting a first SCG addition request comprising the first SCG configuration for establishing a second SCG bearer for the UE, to a third base station; S1504 receiving a first SCG addition response comprising a second SCG configuration which is based on the first SCG configuration in response to transmitting the first SCG addition request, from the third base station; S1505 transmitting a SCG release request to release the first SCG bearer, to the second base station; and S1506 transmitting a second RRC message comprising the second SCG configuration to establish the second SCG bearer, to the UE.

Moreover, receiving the first SCG configuration would include transmitting a second SCG addition request to the second base station for establishing the first SCG bearer with the UE and receiving a second SCG addition response comprising the first SCG configuration from the second base station. The second SCG configuration may include information that is different from the first SCG configuration. Also, after transmitting the SCG release request to release the first SCG bearer, the first base station may further receive, from the second base station, a PDCP SDU of the first SCG bearer, a TX_HFN and a PDCP SN, in response to or only in response to the PDCP SDU being unsuccessfully transmitted previously. The TX_HFN and PDCP SN would be associated with the PDCP SDU, and the first base station may also transmit to the third base station the PDCP SDU of the first SCG bearer, the TX_HFN and the PDCP SN in response to receiving from the second base station the PDCP SDU of the first SCG bearer, the TX_HFN and the PDCP SN.

Moreover, the first base station may receive from the second base station, a receiver hyper frame number (RX_HFN) and a PDCP SN which are associated with another PDCP SDU which is not received by the second base station in response to or only in response to transmitting the SCG release request and would also transmit to the third base station, the RX_HFN and the PDCP SN which are associated with the other PDCP SDU.

Figure 16:
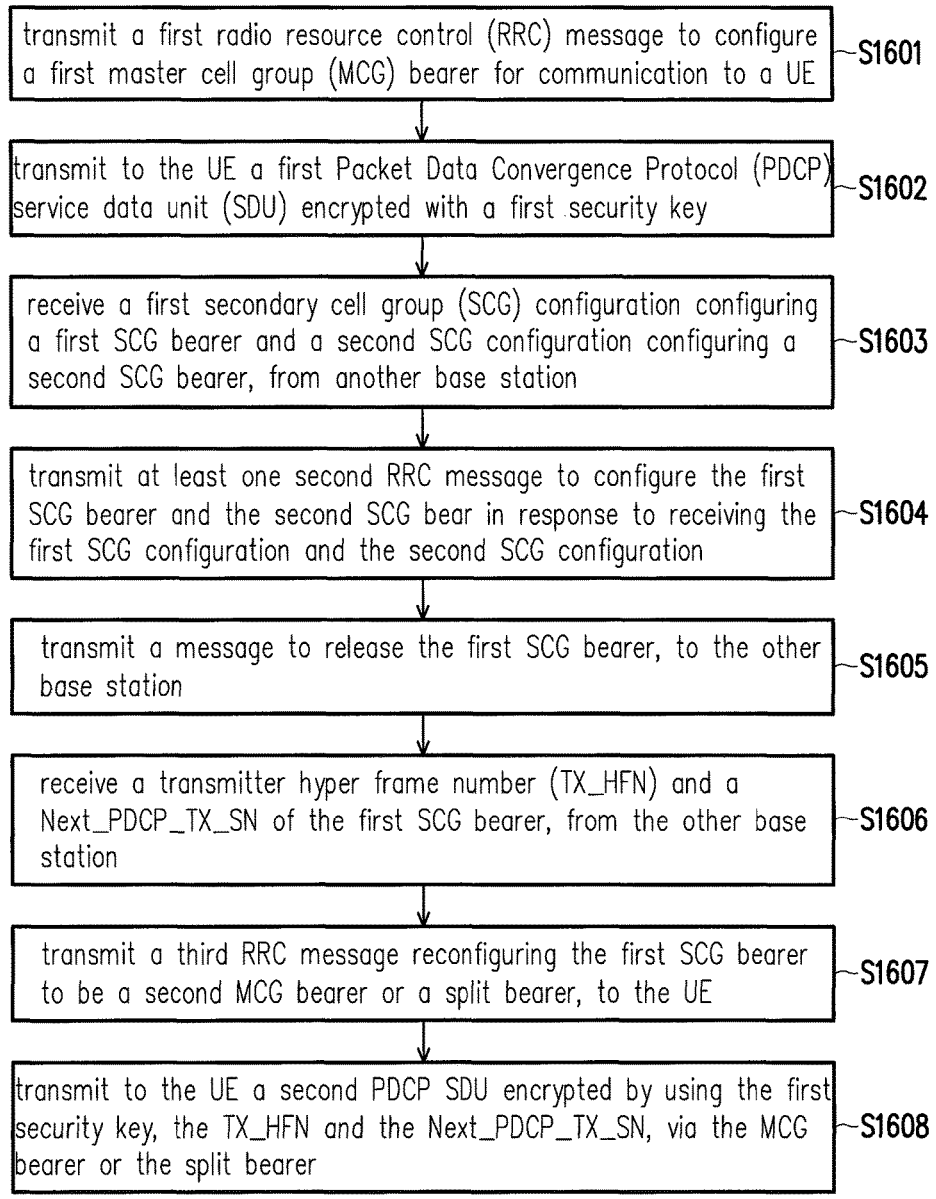
FIG. 16 illustrates a connection modification method that is from the perspective of a base station which provides service to a user equipment (UE) connected to multiple base stations.

FIG. 16 illustrates a connection modification method that is from the perspective of a base station of multiple base stations which provides service to a user equipment (UE) connected to the multiple base stations. The method is consistent with the fifth exemplary embodiments as aforementioned as would include S1601 transmitting a first radio resource control (RRC) message to configure a first master cell group (MCG) bearer for communication to a UE; S1602 transmitting to the UE a first Packet Data Convergence Protocol (PDCP) service data unit (SDU) encrypted with a first security key; S1603 receiving a first secondary cell group (SCG) configuration configuring a first SCG bearer and a second SCG configuration configuring a second SCG bearer, from another base station; S1604 transmitting at least one second RRC message to configure the first SCG bearer and the second SCG bear in response to receiving the first SCG configuration and the second SCG configuration; S1605 transmitting a message to release the first SCG bearer, to the other base station; S1606 receiving a transmitter hyper frame number (TX_HFN) and a Next_PDCP_TX_SN of the first SCG bearer, from the other base station; S1607 transmitting a third RRC message reconfiguring the first SCG bearer to be a second MCG bearer or a split bearer, to the UE; and S1608 transmitting to the UE a second PDCP SDU encrypted by using the first security key, the TX_HFN and the Next_PDCP_TX_SN, via the MCG bearer or the split bearer.

Moreover, the base station may further receive a receiver hyper frame number (RX_HFN) and a PDCP sequence number (SN) associated with a third PDCP SDU which is associated with the first SCG bearer and not received by the other base station, from the other base station in response to transmitting the message.

Figure 17:
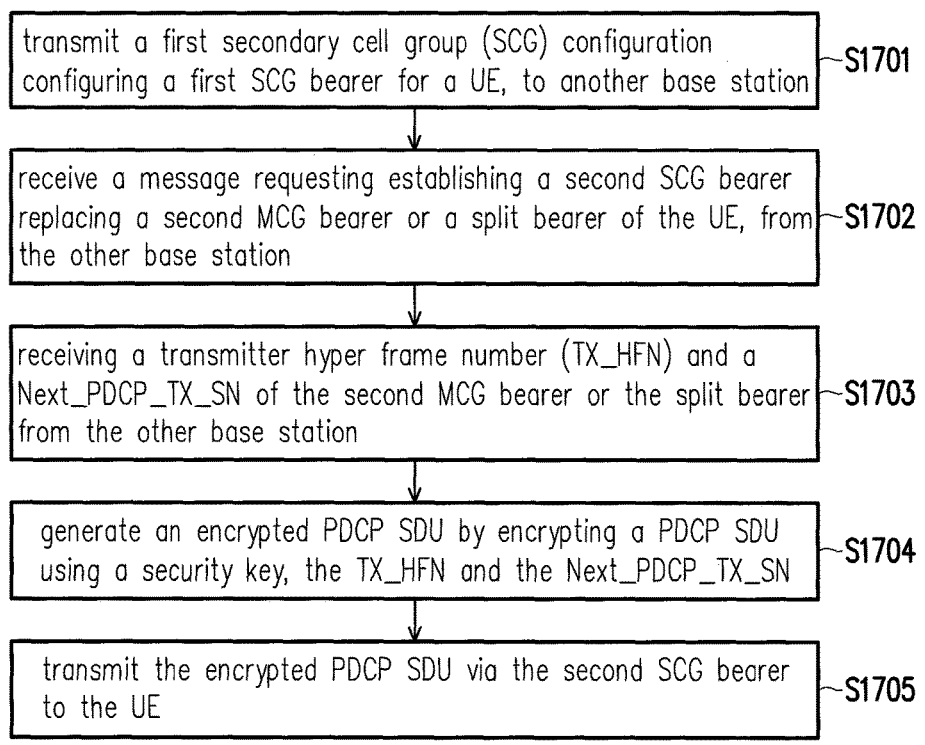
FIG. 17 illustrates a connection modification method that is from the perspective of a base station (e.g. SeNB) which provides service to a user equipment (UE) connected to multiple base stations.

FIG. 17 illustrates a connection modification method that is from the perspective of a base station (e.g. SeNB) of multiple base stations which provides service to a user equipment (UE) connected to the multiple base stations. The method is consistent with the sixth exemplary embodiments as aforementioned as would include S1701 transmitting a first secondary cell group (SCG) configuration configuring a first SCG bearer for a UE, to another base station; S1702 receiving a message requesting establishing a second SCG bearer replacing a second MCG bearer or a split bearer of the UE from the other base station; S1703 receiving a transmitter hyper frame number (TX_HFN) and a Next_PDCP_TX_SN of the second MCG bearer or the split bearer, from the other base station; S1704 generating an encrypted PDCP SDU by encrypting a PDCP SDU using a security key, the TX_HFN and the Next_PDCP_TX_SN; and S1705 transmitting the encrypted PDCP SDU via the second SCG bearer to the UE.

Moreover, the base station may further receive a receiver hyper frame number (RX_HFN) and a PDCP sequence number (SN) associated with the PDCP SDU which is associated with the second MCG bearer or the split bearer but not received by the other base station in response to receiving the message.

In view of the aforementioned descriptions, the present disclosure is suitable for being used in a wireless communication system and provides mechanisms to re-configure radio bearers, to encrypt/decrypt PDCP SDUs using correct security key and to re-transmit PDCP SDUs so as to avoid losses of PDCP SDUs as a result of a SCG change.

No element, act, or instruction used in the detailed description of disclosed embodiments of the present application should be construed as absolutely critical or essential to the present disclosure unless explicitly described as such. Also, it would be apparent to an ordinary person skilled in the art that sequences of the steps in each of the exemplary embodiments of the present disclosure could be changed in order to adapt to various designing needs without departing from the spirit of the disclosure. Moreover, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A connection modification method applicable to a user equipment (UE) which is capable of dually connecting to a first and a second base stations, the method comprising:

receiving a first bearer configuration configuring a first master cell group (MCG) bearer for communication with the first base station from the first base station;

configuring a first radio bearer as the first MCG bearer according to the first bearer configuration;

receiving a second bearer configuration configuring a secondary cell group (SCG) bearer for communication with the second base station from the first base station;

configuring a second radio bearer as the SCG bearer according to the second bearer configuration;

generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCN sequence number (SN) associated with the first PDCP SDU;

transmitting the first encrypted PDCP SDU to the first base station;

generating a second encrypted PDCP SDU by encrypting a second PDCP SDU of the second radio bearer by using a second security key, a second TX_HFN and a second PDCP SN associated with the second PDCP SDU;

transmitting the second encrypted PDCP SDU to the second base station;

receiving a radio resource control (RRC) message comprising a third bearer configuration re-configuring the SCG bearer to be either a second MCG bearer or a split bearer from the first base station;

re-configuring the second radio bearer either as the second MCG bearer or the split bearer according to the third bearer configuration;

generating a third encrypted PDCP SDU by encrypting a third PDCP SDU of the second radio bearer by using the first security key, the second TX_HFN and a third PDCP SN associated with the third PDCP SDU, after the second radio bearer is reconfigured to the second MCG bearer or the split bearer; and transmitting the third encrypted PDCP SDU to the first base station, wherein the third PDCP SDU was encrypted using the second security key, the second TX_HFN, and the third PDCP SN, and was unsuccessfully transmitted to the second base station.

2. The method of claim 1 further comprising: setting the third PDCP SN according to a Next_PDCP_TX_SN associated with the SCG bearer, wherein the Next_PDCP_TX_SN indicates a PDCP SN of the next PDCP SDU to be transmitted.

3. A connection modification method applicable to a user equipment (UE) capable of dually connecting to a first and a second base stations, the method comprising:

receiving a first bearer configuration configuring a first master cell group (MCG) bearer for communication with the first base station from the first base station;

configuring a first radio bearer as the first MCG bearer according to the first bearer configuration;

receiving a second bearer configuration configuring a second MCG bearer or a split bearer for communication with the first base station from the first base station;

configuring a second radio bearer as the second MCG bearer or the split bearer according to the second bearer configuration;

receiving a third bearer configuration configuring a first secondary cell group (SCG) bearer for communication with the second base station, from the first base station;

configuring a third radio bearer as the first SCG bearer according to the third bearer configuration;

generating a first encrypted Packet Data Convergence Protocol (PDCP) service data unit (SDU) by encrypting a first PDCP SDU of the first radio bearer by using a first security key, a first transmitter hyper frame number (TX_HFN) and a first PDCP sequence number (SN) associated with the first PDCP SDU;

transmitting the first encrypted PDCP SDU to the first base station;

generating a second encrypted PDCP SDU by encrypting a second PDCP SDU of the second radio bearer by using the first security key, a second TX_HFN and a second PDCP SN associated with the second PDCP SDU;

transmitting the second encrypted PDCP SDU to the first base station;

generating a third encrypted PDCP SDU by encrypting a third PDCP SDU of the third radio bearer by using a second security key, a third TX_HFN and a third PDCP SN associated with the third PDCP SDU;

transmitting the third encrypted PDCP SDU to the second base station;

receiving a radio resource control (RRC) message comprising a fourth bearer configuration re-configuring the second MCG bearer or the split bearer to be a second SCG bearer;

re-configuring the second radio bearer as the second SCG bearer according to the fourth bearer configuration;

generating a fourth encrypted PDCP SDU by encrypting a fourth PDCP SDU of the second radio bearer by using the second security key, the second TX_HFN and a fourth PDCP SN associated with the fourth PDCP SDU, after the second radio bearer is reconfigured to the second SCG bearer; and transmitting the fourth encrypted PDCP SDU to the second base station, wherein the fourth PDCP SDU was encrypted using the first security key, the second TX_HFN and the fourth PDCP SN, and was unsuccessfully transmitted to the first base station before the second radio bearer is reconfigured to the second SCG bearer.

4. The method of claim 3 further comprising setting the fourth PDCP SN according to a Next_PDCP_TX_SN associated with the second MCG bearer or the split bearer, wherein the Next_PDCP_TX_SN indicates a PDCP SN of the next PDCP SDU to be transmitted.

5. A connection modification method applicable to a base station, the method comprising:
   transmitting a first radio resource control (RRC) message to configure a first master cell group (MCG) bearer for communication to a UE;
   transmitting to the UE a first Packet Data Convergence Protocol (PDCP) service data unit (SDU) encrypted with a first security key;
   receiving a first secondary cell group (SCG) configuration configuring a first SCG bearer, from a second base station;
   transmitting at least one second RRC message to configure the first SCG bearer in response to receiving the first SCG configuration, wherein the second base station transmits a third PDCP SDU encrypted by a second security key to the UE via the first SCG bearer;
   transmitting a message to release the first SCG bear, to the second base station;
   receiving a transmitter hyper frame number (TX_HFN) and a Next_PDCP_TX_SN of the first SCG bearer, from the other base station, wherein the Next_PDCP_TX_SN indicates a PDCP SN of the next PDCP SDU to be transmitted;
   transmitting a third RRC message reconfiguring the first SCG bearer to be a second MCG bearer or a split bearer, to the UE;
   transmitting to the UE a second PDCP SDU encrypted by using the first security key, the TX_HFN and the Next_PDCP_TX_SN, via the MCG bearer or the split bearer; and
   receiving a receiver hyper frame number (RX_HFN) and a PDCP sequence number (SN) associated with a third PDCP SDU which is associated with the first SCG bearer and not received, from the other base station in response to transmitting the message.

6. A connection modification method applicable to a second base station, the method comprising:
   transmitting a first secondary cell group (SCG) configuration configuring a first SCG bearer for a UE to a first base station;
   receiving a message requesting establishing a second SCG bearer replacing a second MCG bearer or a split bearer of the UE, from the first base station, wherein the first base station transmits a first PDCP SDU of the first MCG bearer or the split bearer which is encrypted by using a first security key to the UE;
   receiving a transmitter hyper frame number (TX_HFN) and a Next_PDCP_TX_SN of the second MCG bearer or the split bearer from the first base station, wherein the Next_PDCP_TX_SN indicates a PDCP SN of the next PDCP SDU to be transmitted;
   generating an encrypted PDCP SDU by encrypting a PDCP SDU using a second security key, the TX_HFN and the Next_PDCP_TX_SN;
   transmitting the encrypted PDCP SDU via the second SCG bearer to the UE; and
   receiving a receiver hyper frame number (RX_HFN) and a PDCP sequence number (SN) associated with the PDCP SDU which is associated with the second MCG bearer or the split bearer but not received in response to receiving the message.

\* \* \* \* \*